US012010788B2

(12) United States Patent
Vekselman et al.

(10) Patent No.: US 12,010,788 B2
(45) Date of Patent: Jun. 11, 2024

(54) SYSTEMS, DEVICES, AND METHODS FOR INITIATING BEAM TRANSPORT IN A BEAM SYSTEM

(71) Applicant: TAE TECHNOLOGIES, INC., Foothill Ranch, CA (US)

(72) Inventors: Vladislav Vekselman, Lake Forest, CA (US); Suu Duong, Lake Forest, CA (US); Alexander Dunaevsky, Corona, CA (US); Igor Nikolaevich Sorokin, Novosibirsk (RU)

(73) Assignee: TAE TECHNOLOGIES, INC., Foothill Ranch (CA)

( * ) Notice: Subject to any disclaimer, the term of this patent is extended or adjusted under 35 U.S.C. 154(b) by 205 days.

(21) Appl. No.: 17/400,979

(22) Filed: Aug. 12, 2021

(65) Prior Publication Data

US 2022/0078900 A1 Mar. 10, 2022

Related U.S. Application Data

(60) Provisional application No. 63/213,618, filed on Jun. 22, 2021, provisional application No. 63/065,436, filed on Aug. 13, 2020.

(51) Int. Cl.
*H05H 9/04* (2006.01)
*H05H 9/02* (2006.01)
(Continued)

(52) U.S. Cl.
CPC ......... *H05H 9/02* (2013.01); *H05H 2007/225* (2013.01); *H05H 2007/227* (2013.01)

(58) Field of Classification Search
CPC ............... H05H 9/02; H05H 2007/225; H05H 2007/227; H05H 2277/11; H05H 5/063
See application file for complete search history.

(56) References Cited

U.S. PATENT DOCUMENTS 7,498,588 B1 * 3/2009 Gordon .................... H05H 5/06 315/111.81
2011/0118530 A1 5/2011 Balakin
(Continued)

FOREIGN PATENT DOCUMENTS

RU 2 610 148 C1 2/2017

OTHER PUBLICATIONS

Abramovich, A. et al., "Study of Radiation Build up and Mode Evolution in the Israeli Electrostatic Accelerator Free-Electron Laser Oscillator," IEEE Transactions on Plasma Science, 27(2):563-567, (Apr. 1, 1999).
(Continued)

*Primary Examiner* — Minh D A
(74) *Attorney, Agent, or Firm* — ALSTON & BIRD LLP

(57) ABSTRACT

Embodiments of systems, devices, and methods relate to initiating beam transport for an accelerator system. An example method includes increasing a bias voltage of one or more electrodes of the accelerator system to a first voltage level and extracting a charged particle beam from a beam source such that the beam is transported through the accelerator system. The beam has a beam current that results in a first transient voltage drop within a threshold. The method further includes increasing the beam current at a rate that results in one or more subsequent transient voltage drops within the threshold until the accelerator system has reached nominal conditions. Another example method includes biasing one or more electrodes of an accelerator system and selectively extracting, according to a duty cycle function, a charged particle beam from a beam source such that the charged particle beam is transported through the accelerator system.

26 Claims, 13 Drawing Sheets

(51) Int. Cl.

| | |
|---|---|
| ***H05H 13/00*** | (2006.01) |
| ***H05H 13/10*** | (2006.01) |
| *H05H 7/22* | (2006.01) |

(56) References Cited

U.S. PATENT DOCUMENTS

| | | | | |
|---|---|---|---|---|
| 2016/0064186 | A1* | 3/2016 | Chang | H05H 5/063<br>250/288 |
| 2017/0053776 | A1* | 2/2017 | Lee | H01J 27/24 |
| 2018/0350559 | A1* | 12/2018 | Matsushita | H01J 37/3171 |

OTHER PUBLICATIONS

Ivanov, A. et al., "Suppression of an unwanted flow of charged particles in a tandem accelerator with vacuum insulation," Journal of Instrumentation, Intitute of Physics Publishing, 11(4):1-7, (Apr. 13, 2016).

WIPO Application No. PCT/US2021/045729, PCT International Search Report and Written Opinion of the International Searching Authority dated Jan. 24, 2022, 20 pgs.

* cited by examiner 20 (14)

SYSTEMS, DEVICES, AND METHODS FOR INITIATING BEAM TRANSPORT IN A BEAM SYSTEM

CROSS-REFERENCE TO RELATED APPLICATIONS

The present application claims priority to U.S. Provisional Application Ser. No. 63/213,618, titled "SYSTEMS, DEVICES, AND METHODS FOR MODULATED INITIATION OF BEAM TRANSPORT IN A BEAM SYSTEM," filed Jun. 22, 2021, and to U.S. Provisional Application Ser. No. 63/065,436, titled "SYSTEMS, DEVICES, AND METHODS FOR INITIATING BEAM TRANSPORT IN A BEAM SYSTEM," filed Aug. 13, 2020, the contents of both of which are incorporated herein by reference in their entirety for all purposes.

FIELD

The subject matter described herein relates generally to systems, devices, and methods of initiating beam transport in a beam system and to systems, devices, and methods of modulated initiation of beam transport in a beam system.

BACKGROUND

Boron neutron capture therapy (BNCT) is a modality of treatment of a variety of types of cancer, including some of the most difficult types. BNCT is a technique that selectively aims to treat tumor cells while sparing the normal cells using a boron compound. A substance that contains boron is injected into a blood vessel, and the boron collects in tumor cells. The patient then receives radiation therapy with neutrons (e.g., in the form of a neutron beam). The neutrons react with the boron to kill the tumor cells while reducing harm caused to normal cells in comparison to alternative therapies. Prolonged clinical research has proven that a beam of neutrons with an energy spectrum within 3-30 kiloelectronvolts (keV) is preferable to achieve a more efficient cancer treatment while decreasing a radiation load on a patient. This energy spectrum or range is frequently referred to as epithermal. Most conventional methods for the generation of epithermal neutrons (e.g., epithermal neutron beams) are based on nuclear reactions of protons (e.g., a proton beam) with either Beryllium or Lithium (e.g., a Beryllium target or a Lithium target).

A tandem accelerator is a type of electrostatic accelerator that can employ a two-step acceleration of charged particles using a single high voltage terminal. The high voltage is used to generate electric field that is applied to the incoming beam of negatively charged ions to accelerate it towards the center of the accelerator. At that point the beam is converted into a beam of opposite polarity charged particles (e.g., positive ions) in a process of charge exchange. Further propagation and interaction of charged beam particulates with a reversed electric field results again in acceleration and energy boost. Therefore, accelerating voltage of only 1.5 MV, which is within the reach of modern technologies of electrical insulation is required to generate charged particles beams with energy of 3 MeV. Such tandem approach of beam acceleration is beneficial as an ion source of a tandem accelerator can be placed at the ground potential, which makes it easier to control and maintain the ion source.

A proton beam provided by a tandem accelerator for the purposes of boron neutron capture therapy (BNCT) has a preferred energy level for neutron production or generation at downstream equipment (e.g., for efficient generation of neutrons on a lithium (Li) target). For a reasonably short treatment time, a particular neutron flux density threshold is required, and with such a requisite threshold comes a minimum proton beam current. A power density associated with such proton beams greatly exceeds the safety limits for materials used in components of a neutron beam system.

Onset of the beam transport through the tandem accelerator at a very high voltage level (e.g., megavolts) is accompanied by various effects which can be formulated in terms of equivalent electrical circuit as an instantaneous loading of the tandem power supply. If a beam current associated with the beam of charged particles is too high, the load variation may be not compensated properly, for example, if the power supply is unable to output current of required amplitude. In this case the power supply responsible for maintaining the tandem accelerator voltage reduces voltage supplied to the accelerator. A reduction in voltage supplied to the accelerator leads to the beam energy reduction which is undesired phenomenon increasing the probability of beamline components damage downstream the accelerator. Depending on availability and settings of interlocks monitoring the beam energy, the beam termination is possible. Thus, initiation as well as recovery of beam transport after beam termination caused by other phenomena within an entire neutron beam system should be carefully handled. A complicated and inefficient recovery or initiation time leads to undesired system down time.

Moreover, a recovery or initiation procedure in which beam energy is time dependent (as opposed to controlled based on other variables) is problematic because beam optics performance can depend on beam energy. Addition of beam dump for absorbing of the beam during the beam initiation or recovery induces constraints on the beamline size (length), complexity, etc. Further, internal beam losses within a tandem accelerator can induce secondary particle emission (e.g., x-rays), negatively impacting performance of the tandem accelerator and lifetime.

For these and other reasons, a need exists for improved, efficient, and compact systems, devices, and methods that provide for safe recovery or initiation of operations for beam transport for beam systems.

SUMMARY

Embodiments of systems, devices, and methods relate to safe recovery or initiation of operations for beam transport for beam systems. An example method includes increasing a bias voltage of one or more electrodes of the accelerator system to a first voltage level. The method further can include extracting a charged particle beam from a beam source such that the beam is transported through the accelerator system. The beam can have a beam current at a first beam current level that results in a first transient voltage drop of the accelerator system within a threshold. The method can further include increasing the beam current at a rate that results in one or more subsequent transient voltage drops of the accelerator system until the accelerator system has reached nominal conditions. The one or more subsequent transient voltage drops can be within the threshold.

Embodiments of systems, devices, and methods further relate to modulated initiation of operations for beam transport for beam systems. An example method includes biasing one or more electrodes of an accelerator system to a voltage level. The example method further includes selectively extracting, according to a duty cycle function, a charged particle beam from a beam source such that the charged particle beam is transported through the accelerator system. The duty cycle function can be linear or non-linear and can include a frequency f, which can be a fixed (constant) or variable frequency. The duty cycle function can include a variable pulse duration such that the variable pulse duration increases over time with each selective extraction of the charged particle beam.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
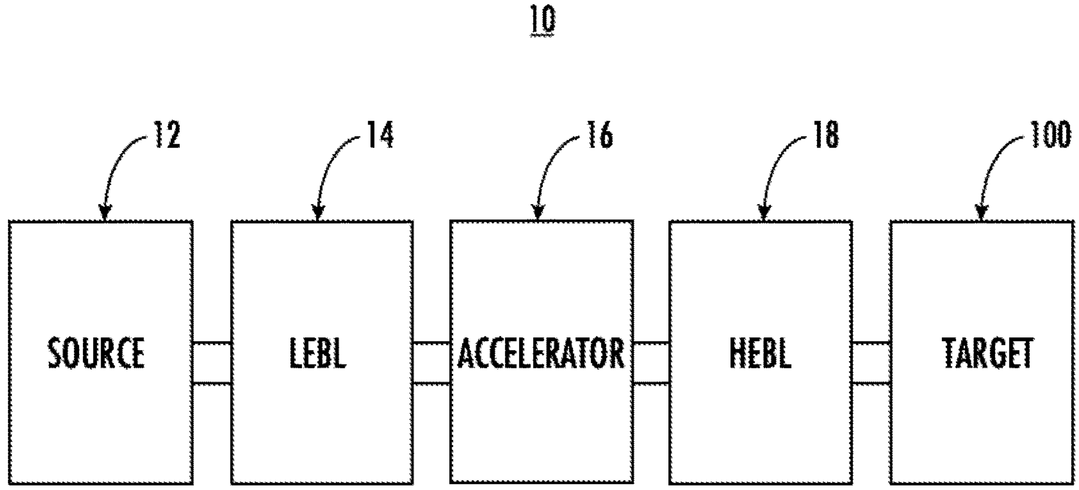
FIG. 1A is a schematic diagram of an example of a neutron beam system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The term "particle" is used broadly herein and, unless otherwise limited, can be used to describe an electron, a proton (or H+ ion), or a neutron, as well as a species having more than one electron, proton, and/or neutron (e.g., other ions, atoms, and molecules).

Example embodiments of systems, devices, and methods are described herein for operational recovery of a beam system (e.g., including a particle accelerator). The embodiments described herein can be used with any type of particle accelerator or in any particle accelerator application involving production of a charged particle beam at specified energies for supply to the particle accelerator. Embodiments herein can be used in numerous applications, an example of which is as a neutron beam system for generation of a neutron beam for use in boron neutron capture therapy (BNCT). For ease of description, many embodiments described herein will be done so in the context of a neutron beam system for use in BNCT, although the embodiments are not limited to just neutron beams nor BNCT applications.

Voltage performance is an important metric or goal for electrostatic particle accelerators. Voltage performance broadly refers to an output voltage capability and stability because the accelerating voltage applied to a charged particle beam within the particle accelerator is preferably known and controllable. A stability of the accelerating voltage V (and thus the beam energy) is often affected by the limitation of the power supply output current (charging current) $I_{CH}$, charged particle beam current $I_B$, and by fluctuations of discharge currents, $I_{dis}$, inside the accelerator volume. In steady state condition the current balance can be expressed as follows:

$$\frac{V}{Z} = I_{CH} - (I_B + I_{dis}) \tag{1}$$

where Z is a total load of the accelerator power supply. $I_{dis}$ includes dark currents (e.g., leak current along insulators), corona and spark discharges, and the like.

In the case of spark development, which is accompanied by relatively high discharge current magnitudes, the induced voltage fluctuations are not well handled by existing voltage stabilization circuits due to power limitations. Depending on the magnitude of the discharge current, the accelerator can experience partial or complete voltage breakdown. The accelerator voltage drop likely exceeds a threshold value above which the charged particle beam transport becomes unsafe and thus is terminated by the control system. Such an action prevents damage of the beamline components (including downstream from the accelerator).

After a voltage breakdown event of the accelerator, re-initiation of beam transport is a non-trivial task for beams of relatively high current. Indeed, in view of equation (1) above, if the charged particle beam current, $I_B$, overcomes the charging current, $I_{CH}$, then abrupt switching on of the beam can result in an undesired accelerator voltage drop or breakdown. This, in turn, likely terminates the beam again due to safety procedures. Accordingly, breakdown recovery is challenging for beams having relatively high current because it is likely steady state $I_B$ will exceed $I_{CH}$ and the system may not be efficiently recoverable.

Because embodiments of the present disclosure enable gradual variation of a negative ion beam current extracted from the ion source by way of fine tuning of the ion source operation state, a beam current of the extracted negative ion beam can be smoothly varied and gradually increased. Smooth variations and gradual increases in the extracted beam current enable the safe recovery and initiation of beam transport within a neutron beam system.

Methods of tuning the ion source, as referred to herein, promote matching of the plasma parameters near the ion extraction region, ion source components bias and current, ion extraction and beam transport optics in order to produce an ion beam of desired current magnitude downstream the ion source. Tuning the ion source can include pre-setting parameters of involved components or using more complex control logic to accommodate for non-desired deviation of the beam current from the desired value. For example, in a volumetric type ion source such tuning can be accomplished by way of controlling arc discharge current, filament current, plasma and extraction electrodes voltage, rate of hydrogen gas feeding into the ion source, and the like.

Advantageously, embodiments of the present disclosure enable efficient and safe operational recovery of a beam transport within a beam system while preserving beam energy. In certain embodiments, only the beam current is adjusted during the proposed beam recovery method.

While multiple initial states of a neutron beam system can exist before performing operations described herein, examples of an initial state of the neutron beam system include: a) no beam is currently being extracted (e.g., stand by or pre-initiation), or b) no voltage is applied to the tandem accelerator (e.g., breakdown, therefore in need of recovery). While embodiments described herein can refer to “recovery” of beam transport, it will be appreciated that the operations described herein can apply to initiation of the beam transport without departing from the scope of the disclosure.

Initiation of beam transport can involve interlocks (e.g., the aforementioned triggers for terminating beam transport) on accelerator and beamline components to ensure proper and safe beam transport. In a steady state of DC beam generation, these interlocks can be set to react to a deviation from a safe corridor value of a specific measured quantity (e.g., voltage readings outside of a given MV interval, such as 2:2.1), or a temperature exceeding a given threshold (e.g., 40° C.). Such safe intervals of specific measured quantities can be defined according to values that are functions of the beam and beamline components (e.g., an accelerator) parameters. The functional dependences of the safe intervals may not be linear and can be quite complex. Accordingly, changing operational parameters of the beamline can result in adjustment of the interlocks to maintain safety standards for the beamline components or other related equipment. Such an approach results in a complicated control system, and requires very sophisticated implementation, tests, longer commissioning times, and dedicated hardware and diagnostics.

Embodiments of the present disclosure overcome the aforementioned drawbacks and more by initiating a DC beam transport with minimal (or no) modifications to control and interlock systems and without additional hardware or diagnostics. The present embodiments further decrease the overall time required to initiate the beam transport at full performance (e.g., a critical process of beam recovery).

Embodiments of the present disclosure enable loading the accelerator by a beam extracted at full current amplitude via a variable duty cycle function. The variable duty cycle function can include a period 1/f and a pulse duration of the beam extraction which can vary over time. For example, in embodiments, a second pulse duration of a second pulse following a first pulse having a first pulse duration can increase by up to a certain percentage of the first pulse duration without triggering beam termination or other undesirable component conditions (e.g., an accelerator voltage drop beyond a tolerable voltage drop threshold). That is, in certain embodiments, a subsequent pulse duration can increase by up to 10% a preceding pulse duration. In various embodiments, the percentage by which the subsequent pulse duration can increase can be in a range of 25% of less, 20% or less, 15% or less, or 10% or less. The percentage can depend on beamline components or application specific requirements. In some embodiments, each successive pulse can increase in duration, while in other embodiments, a pulse having an increased duration can be successively repeated at that increased duration, and then another increase in pulse duration can occur. The pulses can be repeated a predetermined number of times, or for a predetermined duration of time, or until the system has stabilized or recovered by a sufficient amount (e.g., based on voltage sensor feedback). For example, a first set of pulses each having a first duration can be repeated for a first time period, then a second set of pulses each having the same second duration (longer than the first duration) can be repeated for a second time period (the same as or different than the first time period), and so forth until the beam is fully recovered. Embodiments described herein enable faster beam recovery because beam transport can be initiated at arbitrary current amplitude (e.g., even at beam current corresponding to nominal performance).

Turning in detail to the figures, FIG. 1A is a schematic diagram of an example embodiment of a beam system 10 for use with embodiments of the present disclosure. In FIG. 1A, beam system 10 includes a source 12, a low-energy beamline (LEBL) 14, an accelerator 16 coupled to the low-energy beamline (LEBL) 14, and a high-energy beamline (HEBL) 18 extending from the accelerator 16 to a target 100. LEBL 14 is configured to transport a beam from source 12 to an input of accelerator 16, which in turn is configured to produce a beam by accelerating the beam transported by LEBL 14 HEBL 18 transfers the beam from an output of accelerator 16 to target 100. Target 100 can be a structure configured to produce a desired result in response to the stimulus applied by the incident beam, or can modify the nature of the beam. Target 100 can be a component of system 10 or can be a workpiece that is conditioned or manufactured, at least in part, by system 10.

Figure 1B:
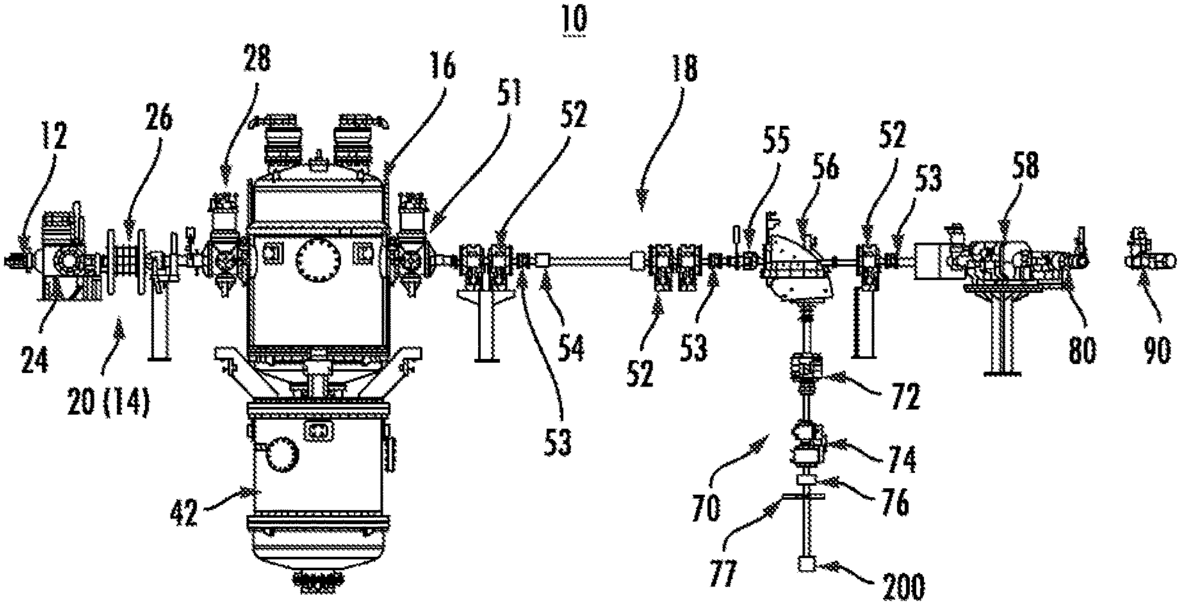
FIG. 1B is a schematic diagram of another example of a neutron beam system.

FIG. 1B is a schematic diagram illustrating another example embodiment of a neutron beam system 10 for use in boron neutron capture therapy (BNCT). Here, source 12 is an ion source and accelerator 16 is a tandem accelerator. Neutron beam system 10 includes a pre-accelerator system 20, serving as a charged particle beam injector, high voltage (HV) tandem accelerator 16 coupled to pre-accelerator system 20, and HEBL 18 extending from tandem accelerator 16 to a neutron target assembly 200 housing target 100 (not shown). In this embodiment target 100 is configured to generate neutrons in response to impact by protons of a sufficient energy, and can be referred to as a neutron generation target. Neutron beam system 10 as well as pre-accelerator system 20 can also be used for other applications such as those other examples described herein, and is not limited to BNCT.

Pre-accelerator system 20 is configured to transport the ion beam from ion source 12 to the input (e.g., an input aperture) of tandem accelerator 16, and thus also acts as LEBL 14. Tandem accelerator 16, which is powered by a high voltage power supply 42 coupled thereto, can produce a proton beam with an energy generally equal to twice the voltage applied to the accelerating electrodes positioned within accelerator 16. The energy level of the proton beam can be achieved by accelerating the beam of negative hydrogen ions from the input of accelerator 16 to the innermost high-potential electrode, stripping two electrons from each ion, and then accelerating the resulting protons downstream by the same applied voltage.

HEBL 18 can transfer the proton beam from the output of accelerator 16 to the target within neutron target assembly 200 positioned at the end of a branch 70 of the beamline extending into a patient treatment room. System 10 can be configured to direct the proton beam to any number of one or more targets and associated treatment areas. In this embodiment, the HEBL 18 includes three branches 70, 80 and 90 that can extend into three different patient treatment rooms, where each branch can terminate in a target assembly 200 and downstream beam shaping apparatus (not shown). HEBL 18 can include a pump chamber 51, quadrupole magnets 52 and 72 to prevent de-focusing of the beam, dipole or bending magnets 56 and 58 to steer the beam into treatment rooms, beam correctors 53, diagnostics such as current monitors 54 and 76, a fast beam position monitor 55 section, and a scanning magnet 74.

The design of HEBL 18 depends on the configuration of the treatment facility (e.g., a single-story configuration of a treatment facility, a two-story configuration of a treatment facility, and the like). The beam can be delivered to target assembly (e.g., positioned near a treatment room) 200 with the use of bending magnet 56. Quadrupole magnets 72 can be included to then focus the beam to a certain size at the target. Then, the beam passes one or more scanning magnets 74, which provides lateral movement of the beam onto the target surface in a desired pattern (e.g., spiral, curved, stepped in rows and columns, combinations thereof, and others). The beam lateral movement can help achieve smooth and even time-averaged distribution of the proton beam on the lithium target, preventing overheating and making the neutron generation as uniform as possible within the lithium layer.

After entering scanning magnets 74, the beam can be delivered into a current monitor 76, which measures beam current. Target assembly 200 can be physically separated from the HEBL volume with a gate valve 77. The main function of the gate valve is separation of the vacuum volume of the beamline from the target while loading the target and/or exchanging a used target for a new one. In embodiments, the beam may not be bent by 90 degrees by a bending magnet 56, it rather goes straight to the right of FIG. 1B, then enters quadrupole magnets 52, which are located in the horizontal beamline. The beam could be subsequently bent by another bending magnet 58 to a needed angle, depending on the building and room configuration. Otherwise, bending magnet 58 could be replaced with a Y-shaped magnet in order to split the beamline into two directions for two different treatment rooms located on the same floor.

Figure 2:
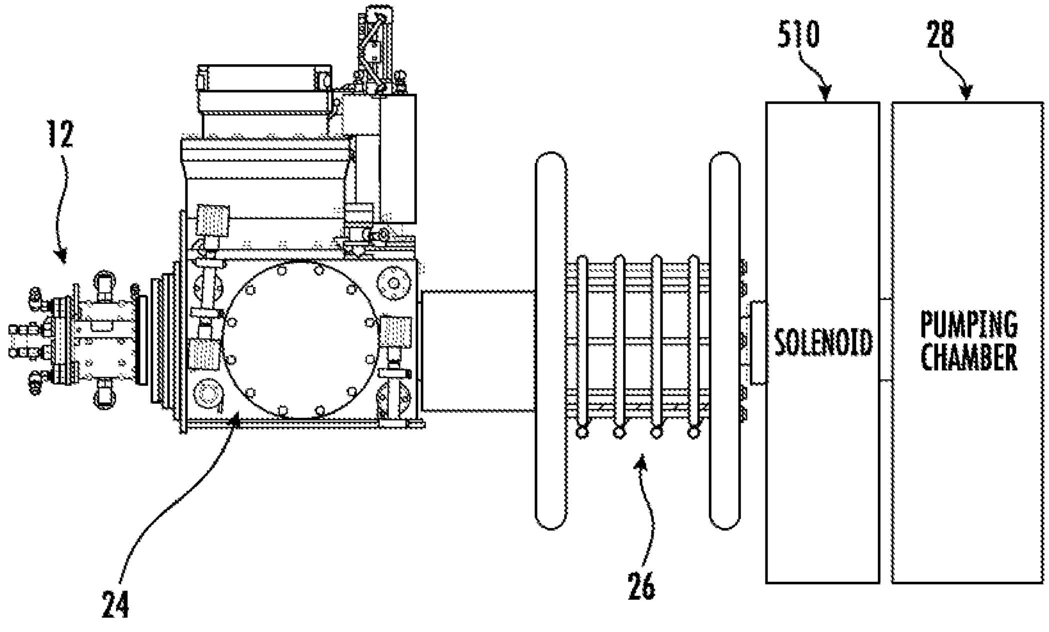
FIG. 2 illustrates an example pre-accelerator system or ion beam injector for use with embodiments of the present disclosure.

FIG. 2 illustrates an example of a pre-accelerator system or ion beam injector for use with embodiments of the present disclosure. In this example, pre-accelerator system 20 (e.g., LEBL 14) includes an einzel lens 30 (not visible in FIG. 2, but depicted in FIGS. 3A-3B), a pre-accelerator tube 26, and a solenoid 510, and is configured to accelerate a negative ion beam injected from ion source 12. The pre-accelerator system 20 is configured to provide acceleration of the beam particles to the energies required for tandem accelerator 16, and to provide overall convergence of the negative ion beam to match input aperture area at an input aperture or entrance of the tandem accelerator 16. The pre-accelerator system 20 is further configured to minimize or defocus backflow as it passes from the tandem accelerator 16 through the pre-accelerator system in order to reduce the possibility of damage to ion source 12 and/or the backflow reaching the filaments of the ion source.

In embodiments, the ion source 12 can be configured to provide a negative ion beam upstream of the einzel lens 30, and the negative ion beam continues to pass through pre-accelerator tube 26 and a magnetic focusing device (e.g., solenoid) 510. The solenoid 510 can be positioned between the pre-accelerator tube 26 and the tandem accelerator 16 and is electrically couplable with a power supply. The negative ion beam passes through the solenoid 510 to the tandem accelerator 16.

Pre-accelerator system 20 can also include an ion source vacuum box 24 for removing gas, and a pump chamber 28, which, with pre-accelerator tube 26 as well as the other elements described above are part of a relatively low energy beamline leading to the tandem accelerator 16. The ion source vacuum box 24, within which the einzel lens 30 can be positioned, extends from the ion source 12. The pre-accelerator tube 26 can be coupled to the ion source vacuum box 24 and to solenoid 510. A vacuum pump chamber 28 for removing gas can be coupled to the solenoid 510 and the tandem accelerator 16. The ion source 12 serves as a source of charged particles which can be accelerated, conditioned and eventually used to produce neutrons when delivered to a neutron producing target. The example embodiments will be described herein with reference to an ion source producing a negative hydrogen ion beam, although embodiments are not limited to such, and other positive or negative particles can be produced by the source.

The pre-accelerator system 20 can have zero, one, or multiple magnetic elements for purposes such as focusing and/or adjusting alignment of the beam. For example, any such magnetic elements can be used to match the beam to the beamline axis and the acceptance angle of the tandem accelerator 16. The ion vacuum box 24 can have ion optics positioned therein.

There are generally two types of negative ion sources 12, which differ by the mechanism of generation of negative ions: the surface type and the volume type. The surface type generally requires the presence of cesium (Cs) on specific internal surfaces. The volume type relies on formation of negative ions in the volume of a high current discharge plasma. While both types of ion sources can deliver the desired negative ion current for applications related to tandem accelerators, surface type negative ion sources are undesirable for modulation. That is, for modulation of a negative ion beam in embodiments described herein, negative ion sources of the volume type (e.g., without employing cesium (Cs)) are preferred.

Figure 3A:
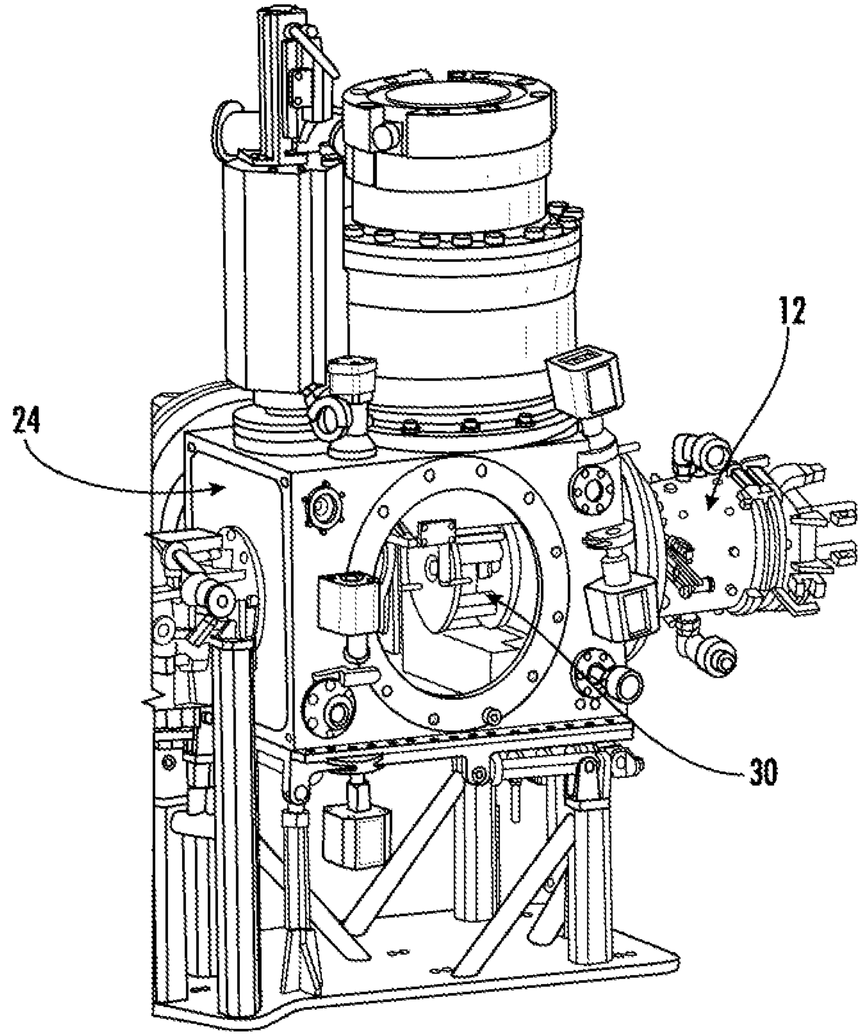
FIG. 3A is a perspective view of the ion source and the ion source vacuum box shown in FIG. 2.
Figure 3B:
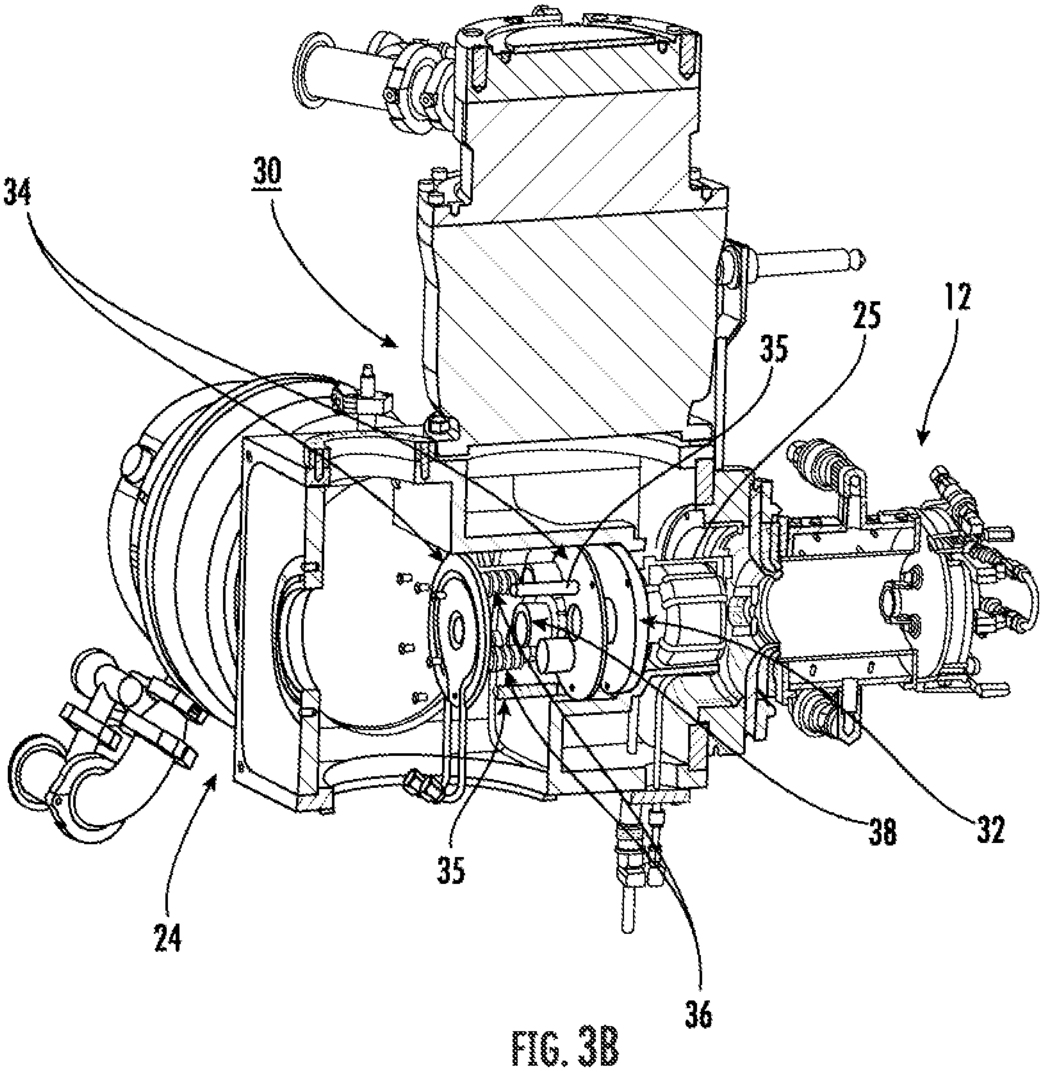
FIG. 3B is an exploded perspective view depicting an example of the einzel lens shown in FIG. 3A.

Turning to FIG. 3A, the ion source vacuum box 24 of the ion beam injector 20 (e.g., or LEBL 14) can include an einzel lens 30 positioned therein. As shown in detail in FIG. 3B, the einzel lens 30, which can be mounted downstream of a ground lens 25 of the ion source 12 within the vacuum box 24, includes a mounting plate 32, two grounded electrodes 34 mounted to the mounting plate 32 and coupled to one of another in spaced relation with mounting rods 35, and a powered (biased) electrode 38 positioned between the two grounded electrodes 34. The electrodes 34 and 38 are made in the form of cylindrical apertures and assembled to have an axial axis coinciding with the beam path. The powered electrode 38 is supported by isolators (or insulators) 36 extending between the grounded electrodes or apertures 34.

The standoff isolators 36 can have a geometric design configured to inhibit development of electron avalanches and to suppress streamer formation and propagation which can result in a flashover formation. The geometric design of standoff isolators 36 can partially screen an external electric field on the insulator surface which drives the electron avalanche and effectively increases the path length. In addition, the materials of insulators/isolators 36 tend to diminish sputtering effects, loss of negative ions on surfaces, volume contamination, and formation of a conductive coating on the insulator or isolator surfaces leading to a decrease of electrical strength.

Functionally, action of the einzel lens 30 on the beam of charged particles advancing from the ion source 12 is akin to the action of optical focusing lens on a beam of light. Namely, the einzel lens 30 is focusing the incoming diverging beam into a spot at the focal plane. However, here the electric fields formed between the pairs of the powered electrode 38 and the two grounded electrodes 34 determine the focusing strength of the einzel lens (focal length distance).

By mounting the einzel lens 30 downstream of the ion source ground lens 25, it diminishes beam free space transportation where the beam is subjected to divergence due to intrinsic space charge.

The dimensions of the axisymmetric or substantially axisymmetric design of the einzel lens 30 are optimized to avoid direct interaction of extracted ions with exposed surfaces of the einzel lens 30.

In operation, negative polarity biasing of the einzel lens 30 results in higher focusing power over the positive bias polarity. Also in operation, the method of power delivery to the einzel lens 30 provides for gradual voltage growth instead of instantaneous voltage application, which reduces growth rates of electric field (dE/dt) at micro-protrusions existing on surfaces of the einzel lens 30 responsible for plasma formation via, for example, an explosive emission mechanism. Impeding of such plasma formation improves electrical strength.

Negative bias potential for an einzel lens in high background pressure is usually not possible due to electrical breakdowns. The configuration of the example embodiments of the einzel lens provided herein, enables the application of negative bias voltages sufficiently high for the 100% current utilization without electrical breakdowns.

Figure 4A:
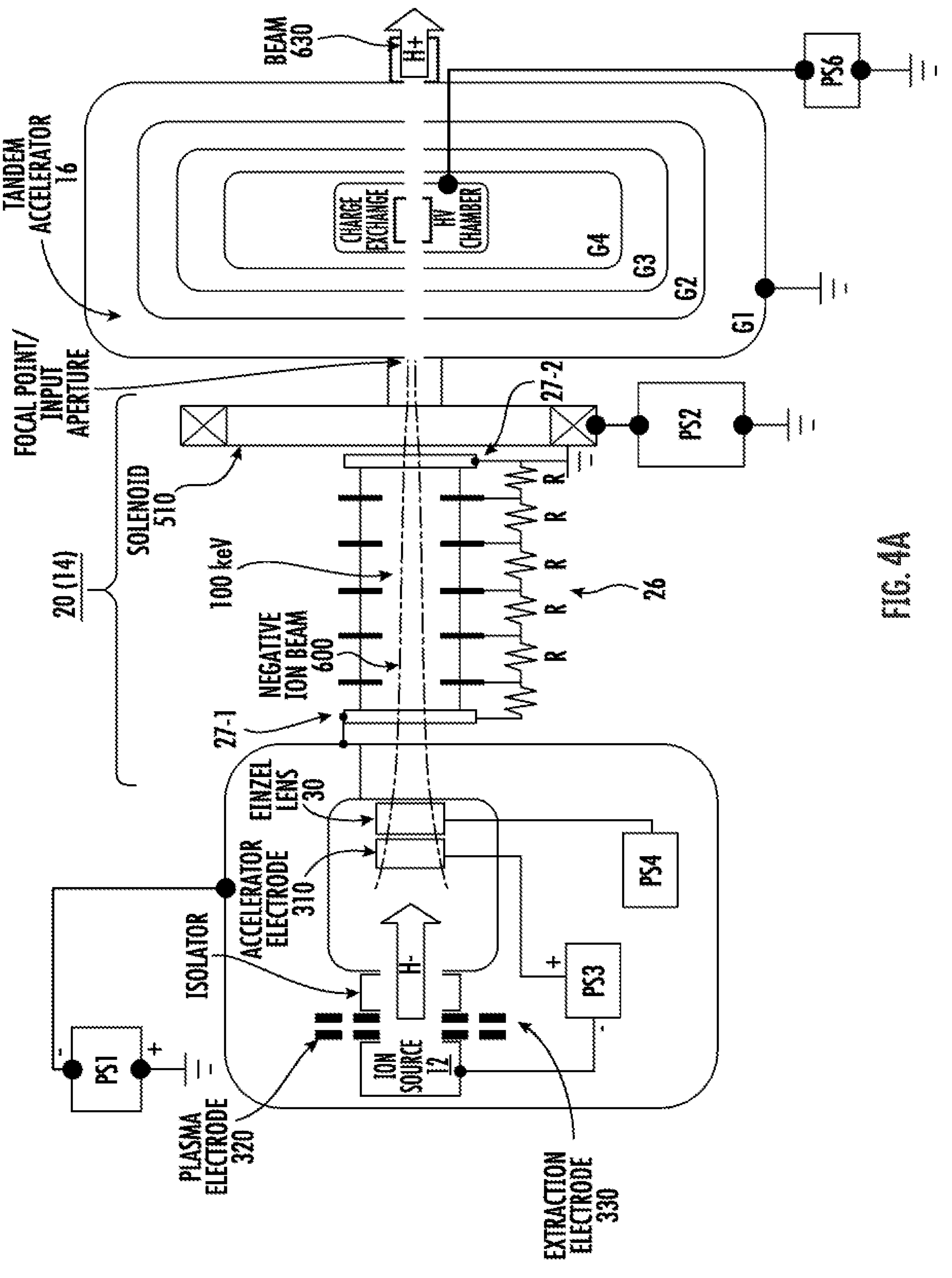
FIG. 4A illustrates an example ion beam source system, for use with embodiments of the present disclosure.

FIG. 4A illustrates an example ion beam source system, for use with embodiments of the present disclosure. In FIG. 4A, an ion source 12 is optionally housed in an ion source enclosure. The ion source 12 includes multiple electrodes, such as a plasma electrode 320, a ground lens 310, and an extraction electrode 330. Optionally, ion source 12 is coupled with an einzel lens 30, and a negative ion beam is injected or propagated from the ion source 12 through the einzel lens 30, a pre-accelerator tube 26, and a solenoid 510 to an input aperture of a tandem accelerator 16.

Figure 4B:
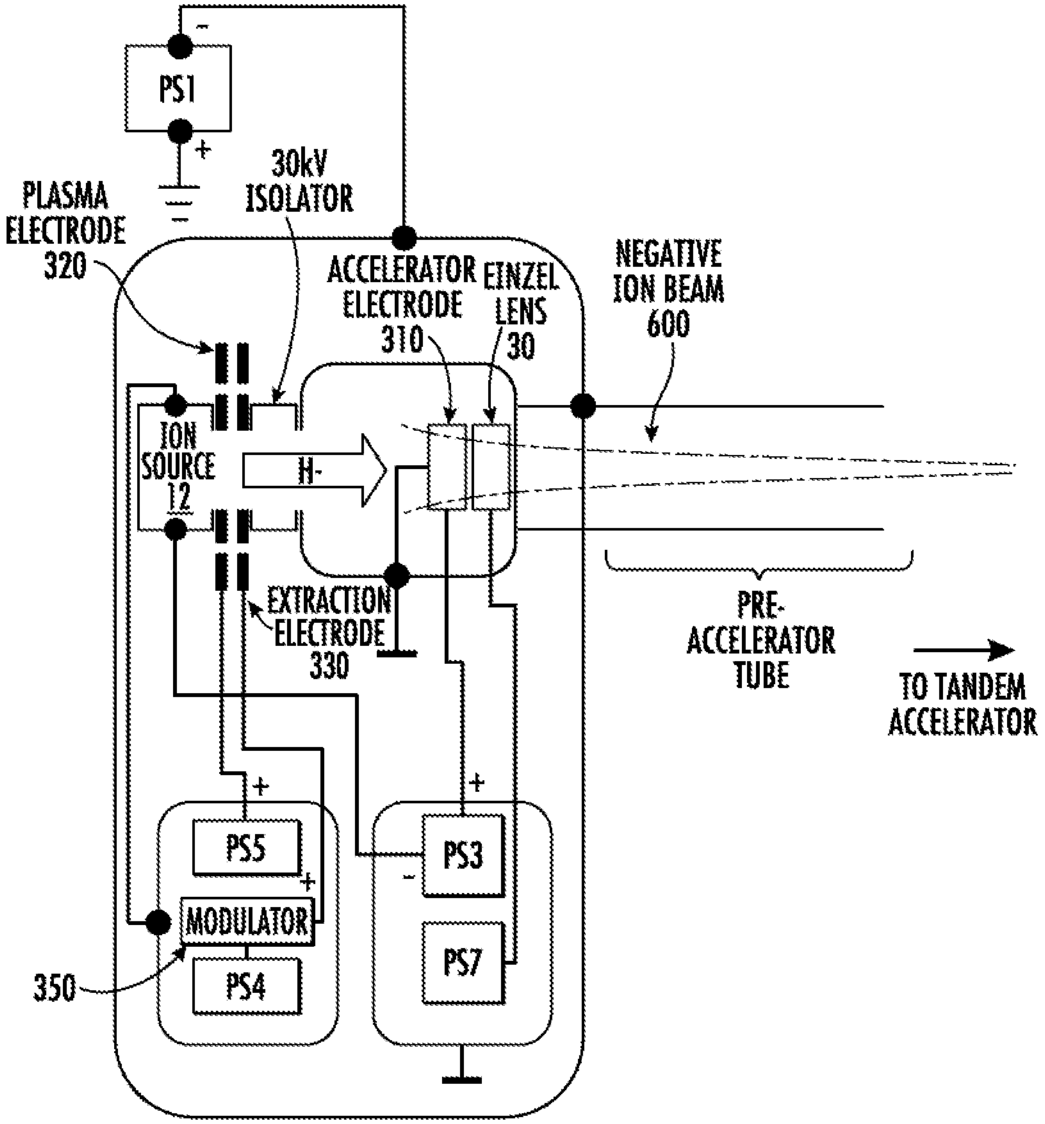
FIG. 4B illustrates an example ion source depicted in FIG. 4A.

Referring to FIG. 4B, ion source 12 can be electrically coupled, at ground lens 310, with a first (grounded) terminal of a power supply PS3, which is in turn electrically coupled at a second terminal to the ion source 12. Biasing of ion source 12 relative to the ground lens 310 allows extraction and transport of a negative ion beam of high current downstream the ion source. In some embodiments, power supply PS3 can provide a voltage of −30 kV. Divergence of the high current negative ion beam due to self-space charge is further suppressed by accelerating the beam in pre-accelerator tube 26 whereas the solenoid 510 is utilized for fine matching of the injected beam with an input aperture of the tandem accelerator 16.

A plasma electrode 320 of ion source 12 can be electrically coupled to a power supply PS5 and an extraction electrode 330 of ion source 12 can be electrically coupled to a modulator 350 which is, in turn, electrically coupled to a power supply PS4. Biasing of plasma electrode 320 enables ion source 12 to maintain a desired electron energy distribution thus facilitating more effective extraction of negative ions from the plasma boundary within the ion source 12 using the extraction electrode 330.

When extraction electrode 330 is biased, a negative ion beam is extracted from ion source 12 accelerated by the ground lens 310 towards the injector components downstream the ion source 12. When extraction electrode 330 is not biased, a negative ion beam is not extracted.

As discussed above, tandem accelerator 16 is powered by a high voltage power supply PS6 coupled thereto, and can produce a proton beam with an energy generally equal to twice the voltage applied to the accelerating electrodes positioned within the tandem accelerator 16. Power supply PS6 can be governed by a feedback loop whereby voltage stability within the tandem accelerator 16 is maintained. That is, a measurement or control device 360 (e.g., a voltmeter) can monitor a voltage across multiple tandem electrodes (G) of the tandem accelerator 16.

The power supply (e.g., PS6) feeding an accelerator 16 can have physical and design-related limitations on its output voltage and current. A control circuit (e.g., measurement or control device 360) can also have limited bandwidth with respect to signal acquisition and processing, and can feature proportional—integral—derivative (PID) loops for output voltage stabilization. These and other factors associated with the power supply (e.g., PS6) can lead to an effective increase of a response time of the power supply (e.g., PS6) for the accelerator 16 under triggered events. As a result, the accelerator 16 can be easily loaded by beam pulses with a duration of less than (or approximately) 1 millisecond (ms) at a frequency of 10 Hz (e.g., a duty cycle of 1%), while the beam current can be as large as 10 milliamps (mA). In contrast, initiation of a 10 mA DC beam transport can cause the accelerator voltage to drop by almost 50% and trigger beam termination.

Embodiments herein address the physical and design-related limitations associated with a power supply (e.g., PS6) feeding the accelerator 16 as well as the control circuit monitoring the power supply and parameters of the accelerator 16 by propelling the loading of the accelerator 16 by a beam current at full performance with a beam duty cycle having a progressively growing variation over time. Full performance of the accelerator can be dictated by application specific requirements (e.g., for patient treatment). In some embodiments beam current is 15 mA at 2.7 MeV.

Figure 5A:
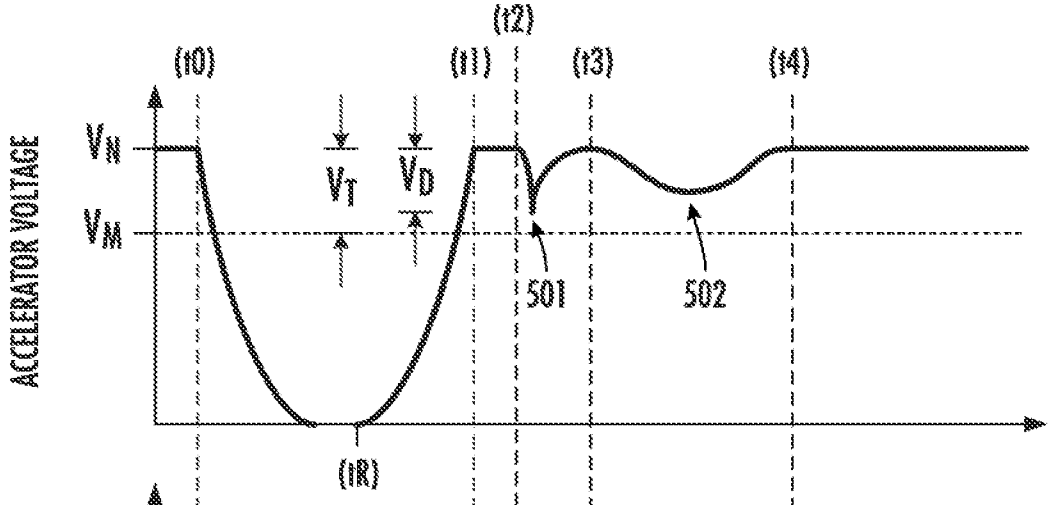
FIGS. 5A-5D illustrate example timing diagrams associated with embodiments of the present disclosure.
Figure 5B:
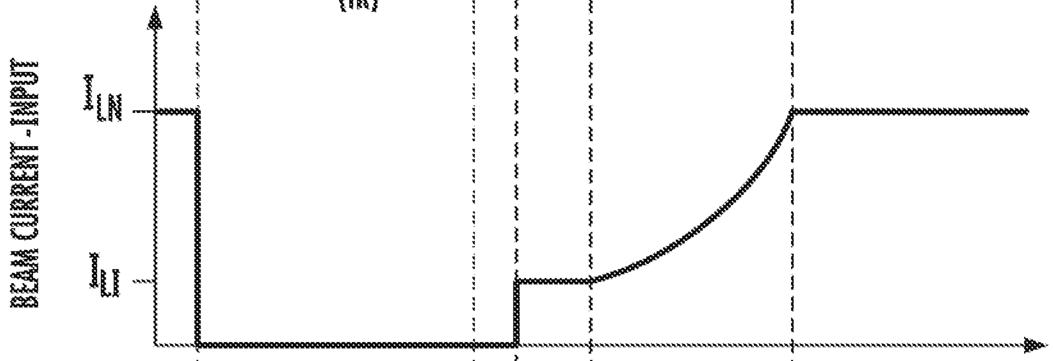
Figure 5C:
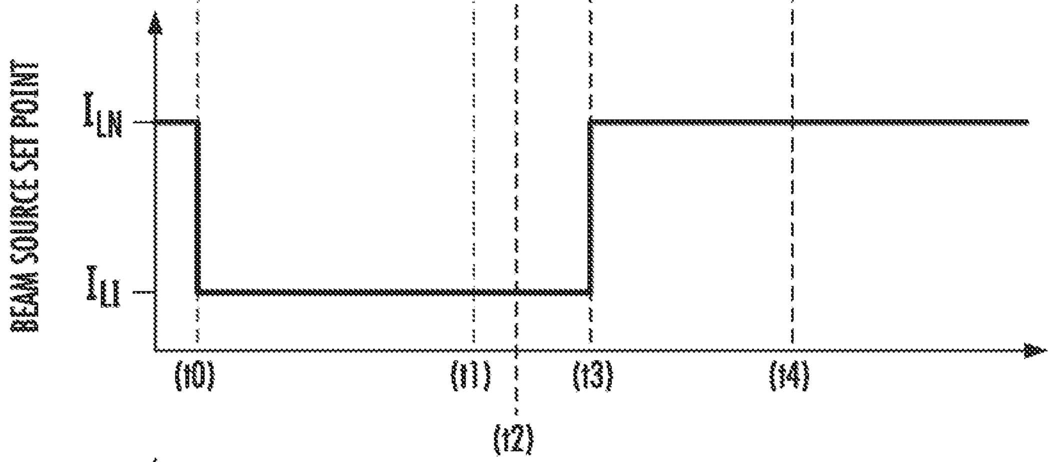

FIGS. 5A-5C are plots depicting an example embodiment of the operation of beam system 10. FIG. 5A is a plot of the voltage of the accelerator power supply (for supply to the electrodes) versus time. FIG. 5B is a plot showing the beam current in LEBL 190 prior to input to accelerator 40, and FIG. 5C is a plot showing the set point for the current of the beam source 22. Prior to time to, accelerator 40 is operating normally for medical treatment, with the accelerator voltage at the normal voltage $V_N$. The beam current is stable at the nominal beam current level ILD. At time t0 an event occurs that causes the accelerator voltage to drop. This can be an intentional shut down of system 10, a breakdown event (e.g., such as from arcing within accelerator 40 given the very high voltages being used), or otherwise. In response to detection of this event a control system 3001A (FIG. 8) for system 10 terminates extraction of the beam and the current falls to zero (FIG. 5B).

Control system 3001A also issues a command, e.g., at t0, for beam source 22 to change or tune the source's set point from $I_{LN}$ to a lower current level $I_{L1}$ appropriate for initiating or restarting the beam. The speed at which beam source 22 will tune to the new set point is dependent on the design and implementation of the beam source, which will vary across embodiments. In this embodiment, the dynamics of beam source 22 require time to modify to the new set point, and beam source 22 reaches the new set point at or prior to time t2. Tuning beam source 22 can occur prior to, during (concurrently with), or after increasing the accelerator voltage to $V_N$.

The process of tuning beam source 22 can include the task of matching plasma parameters, like plasma density, near a beam or ion extraction region of source 22 such that the plasma is sufficient to facilitate reliable extraction of the ion beam at the requested current. Tuning can further include the task of matching the parameters for the extracted ion beam (e.g., energy, alignment, focal distance) with the downstream beam transport optics to minimize losses. Tuning can be performed by adjusting the controllable settings of the ion source components. For example, the tuning can include controlling or adjusting an arc discharge current of the source, adjusting a filament current of the source, adjusting a plasma electrode voltage, adjusting the extraction electrode voltage, and/or adjusting a rate of hydrogen gas feeding into source 22.

After a determination is made to restart system 10, at time tR control system 3001A causes a bias voltage to be applied to the electrodes of accelerator 40, and the accelerator voltage increases towards $V_N$, reaching that level at time t1. At time t2, control system 3001A can cause beam extraction to commence (e.g., by biasing an extraction electrode of source 22) at the $I_{L1}$ set point, and the beam current rises to $I_{L1}$. The immediate propagation of the beam through accelerator 40 results in a transient accelerator voltage drop 501 having a magnitude $V_D$. A direct relationship exists between the magnitudes of $I_{L1}$ and $V_D$, such that a higher $I_{L1}$ level causes a higher $V_D$.

The variation of accelerator voltage translates to a variation in beam energy, which in turn translates to deflection from the optimal axis. While beam optics are present within system 10 to readjust the beam upon misalignment from the axis, these optics often take a short time to detect the misalignment and respond. At relatively high beam currents, even a brief misalignment can result in damage to the beam system components. Thus, $I_{LO}$ is preferably maintained at a relatively low level to avoid damage in the time that the beam is misaligned.

In these example embodiments, the magnitude of $I_{L1}$ can be chosen to ensure the transient voltage drop $V_D$ (and thus the degree of deflection) is kept within a threshold $V_T$. Stated differently, the magnitude of $I_{L1}$ can be such that the accelerator voltage drops to a level above the minimum voltage ($V_M$) permissible to avoid damage to system 10 at the particular $I_{L1}$ level. The threshold corresponds to a maximum permissible deflection time of the beam off of a beam axis for the selected $I_{L1}$. This takes into account the time required by the beam optics components (e.g., magnetic elements) to detect and compensate for the deflection off of the beam axis, as well as the magnitude of the beam current (a weaker beam can be off axis for a relatively longer time before causing damage). The threshold can correspond to an adjustment response time of various components of the beam system. Depending on beamline parameters downstream the tandem accelerator, certain small variations of the beam energy are either not sufficient to cause beamline damage due to small beam deviation from axis or can be compensated for by using active ion optics based on a feedback signal.

At time t3 the accelerator voltage has returned to the nominal level $V_N$, and control system 3001A issues a command to tune beam source 22 to the nominal beam current level $I_{LN}$ (FIG. 5C). In this embodiment, beam source 22 responds by gradually increasing beam current to $I_{LN}$ from time t3 to t4. This gradual increase corresponds to another transient voltage drop 502 that stays within the threshold $V_T$. In some embodiments, multiple sequential commands for set point adjustments at ever increasing levels can be issued to cause source 22 to gradually increase or increase in a step function manner. At time t4 both the accelerator voltage and beam current have returned to nominal levels for treatment, and system 10 has fully recovered or initiated. In some embodiments, system 10 can increase the beam current at a controlled and relatively slow rate from zero to $I_{LN}$ such that the transient voltage drop stays within $V_T$.

Figure 5D:
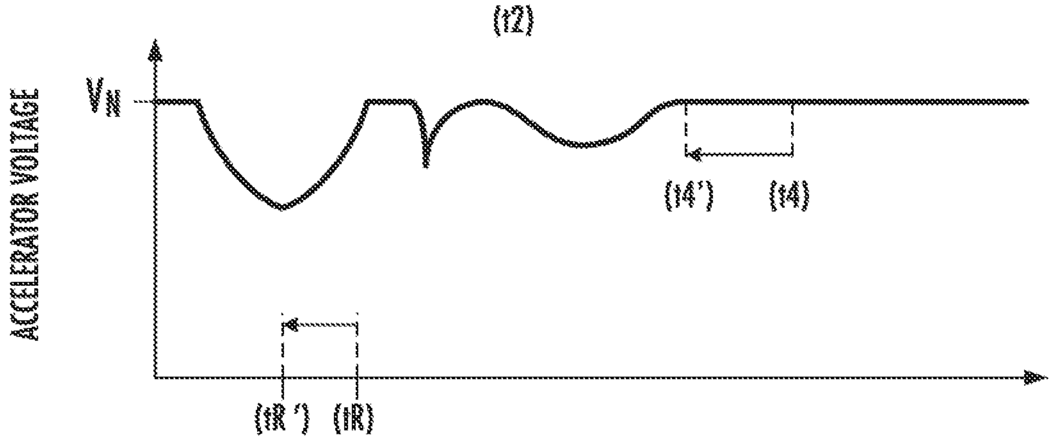

FIG. 5D depicts the accelerator voltage for another example embodiment where the initiation of the ramp up procedure tR' starts at an earlier time than tR of the embodiment of FIG. 5A. Here, tR' occurs as the voltage drop from the initial event at t0 is still ongoing and has not yet reached zero. As such, the time to ramp up the accelerator voltage to $V_N$ is reduced, and system 10 can return to nominal conditions at t4' much sooner than t4 of FIG. 5A. In other words, an shift in tR can correspond to an even greater shift in t4, and thus system 10 can return to nominal treatment conditions more quickly.

Figure 6A:
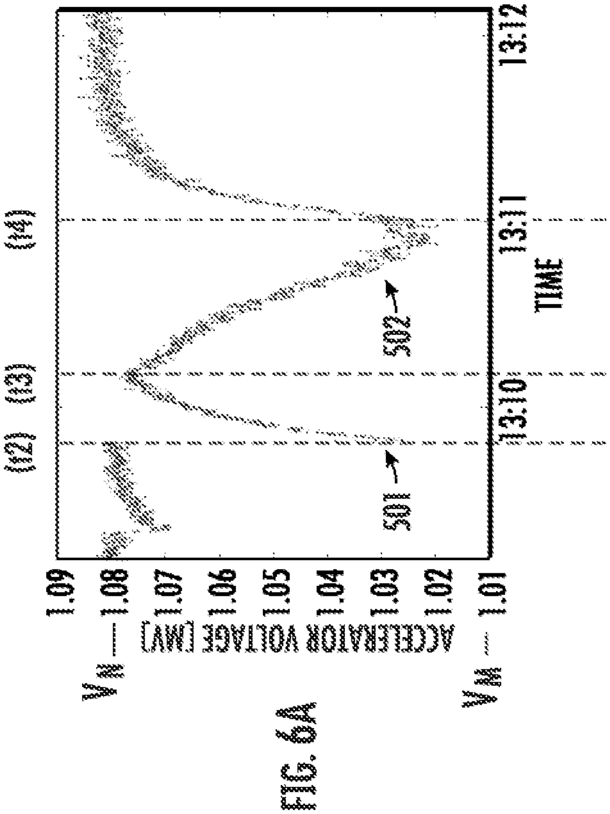
FIGS. 6A-6D illustrate example timing diagrams associated with embodiments of the present disclosure.
Figure 6B:
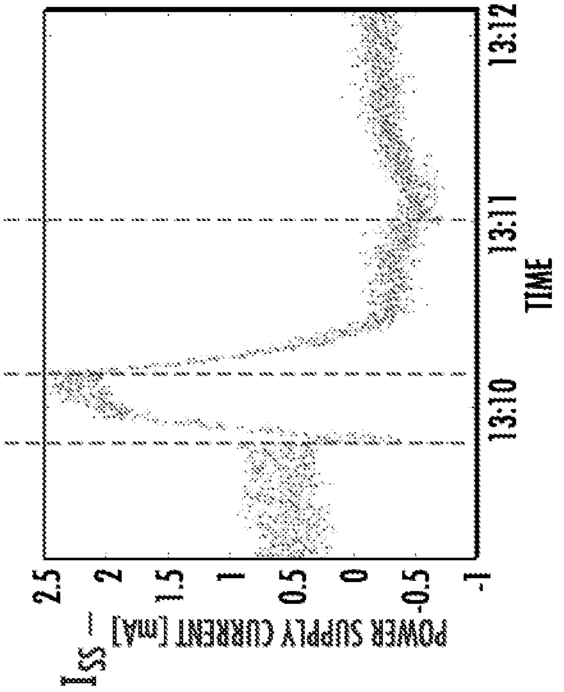
Figure 6C:
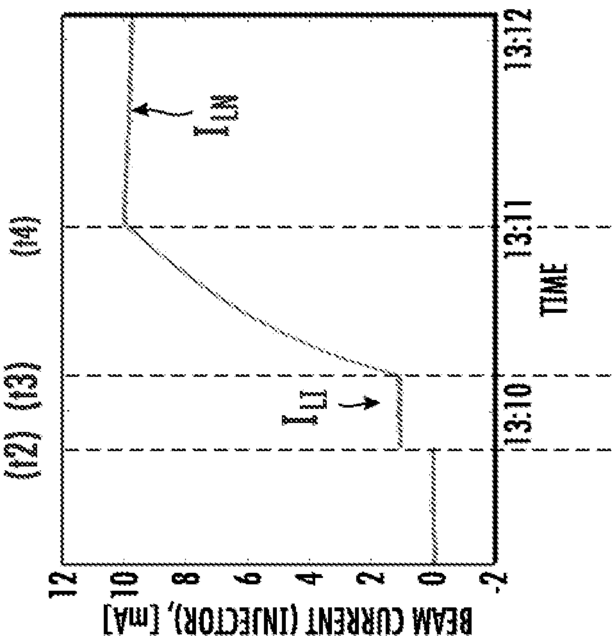
Figure 6D:
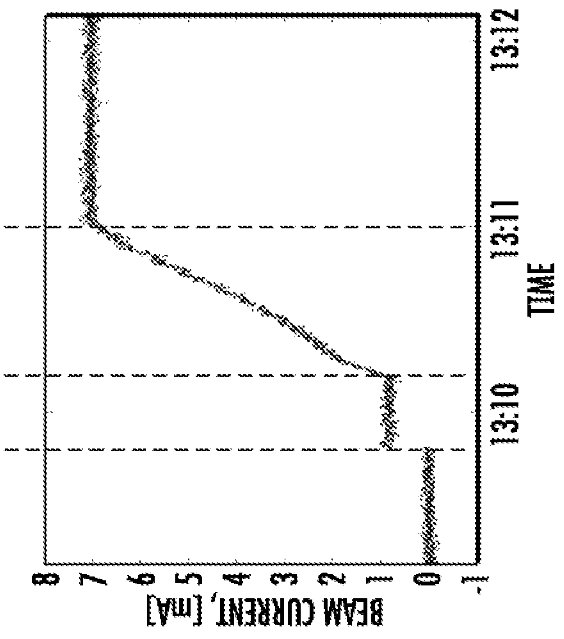

FIGS. 6A-6D are plots depicting data representing the implementation of the example embodiments of FIGS. 5A-5D for beam transport recovery and/or initiation, for use with embodiments of the present disclosure. FIG. 6A depicts the voltage on the electrodes of the accelerator supplied by the power supply, FIG. 6B depicts the charge current ($I_{CH}$) of the accelerator power supply, FIG. 6C depicts negative ion beam current in LEBL 190 prior to input to accelerator 40, and FIG. 6D depicts proton beam current in HEBL 50 after output from accelerator 40. Times t2, t3, and t4 are labeled in FIGS. 6A-6D and correspond to those times described with respect to FIGS. 5A-5C.

Here, prior to time t2 the accelerator voltage is at the nominal level $V_N$ and the beam is off. Prior to time t2, beam source 22 is tuned to $I_{L1}$, which in this embodiment is approximately one milliamp (mA). At time t2 the beam is extracted at $I_{L1}$ and accelerator 40 experiences transient voltage drop 501, and the power supply current briefly drops before rising to a steady state level ($I_{SS}$) of approximately two mA, which is greater than $I_{L1}$. At time t3 the accelerator has reached $V_N$ and the set point for beam source 22 is modified to $I_{LN}$, at which point a gradual increase in beam current occurs until $I_{LN}$ is reached, which is approximately 10 mA (FIG. 6C). At this same time the accelerator voltage experiences a second transient drop 502. Neither of drops 501 nor 502 cause the accelerator voltage to fall below $V_M$. After acceleration and conversion into the proton beam, the beam current becomes approximately 7 mA (FIG. 6D).

Figure 7:
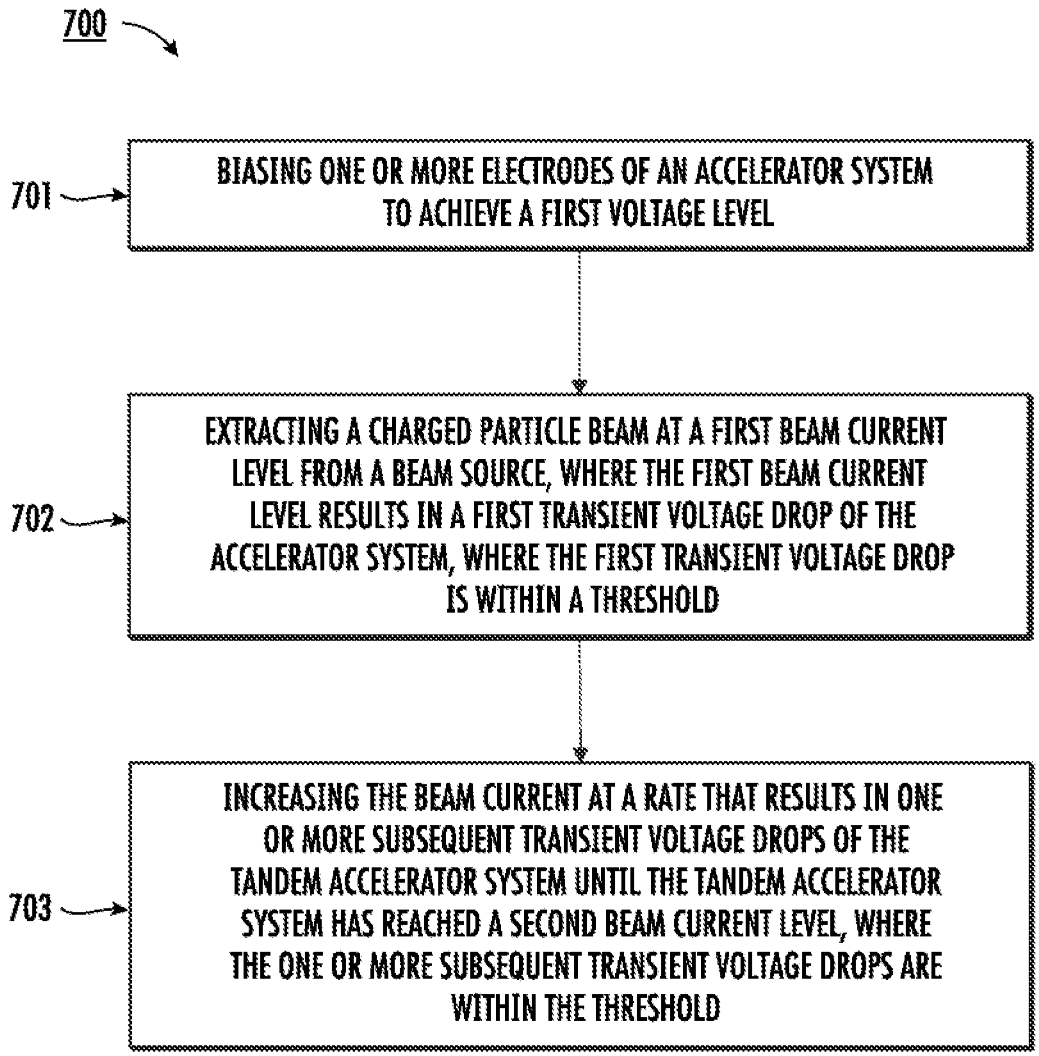
FIG. 7 illustrates example operations for initiating beam transport in a beam system, for use with embodiments of the present disclosure.

FIG. 7 is a flow diagram depicting an example embodiment of a method 700 of initiating beam transport in a beam system. At 701, the bias voltage to one or more electrodes of an accelerator system is increased to a first voltage level (e.g., nominal voltage $V_N$). At 702, a charged particle beam is extracted (or otherwise propagated) from a beam source at a first beam current level (e.g., $I_{L1}$). The first beam current level results in a first transient voltage drop ($V_D$) of the accelerator system, where the first transient voltage drop is within a threshold ($V_T$). The accelerator voltage does not fall below a minimum permissible voltage ($V_M$) for the first beam current level. At 703 the beam current is increased at a rate that results in one or more subsequent transient voltage drops of the accelerator system until the accelerator system has reached a second beam current level (e.g., $I_{LN}$) where the one or more subsequent transient voltage drops are within the threshold.

In the example embodiment of FIG. 6A, the threshold ($V_N$-$V_M$) is approximately 70 kilovolts (kV) for a beam current of approximately 1 mA. The threshold can and will vary based on the magnitude of beam current, resilience of system 10 to impact of the beam when off axis, speed at which beam misalignment can be detected, and speed at which misalignment can be corrected.

The magnitude of $I_{L1}$ can be any current value lower than $I_{LN}$ and the steady state charge current $I_{SS}$ that meets the needs of the particular application. For example, in the embodiment of FIG. 6C, $I_{L1}$ is one milliamp (mA), $I_{SS}$ is two mA, and $I_{LN}$ is approximately ten mA, but both values can vary. In some embodiments, the magnitude of $I_{L1}$ is between 0.01 and 75% of the value of $I_{SS}$.

Figure 8A:
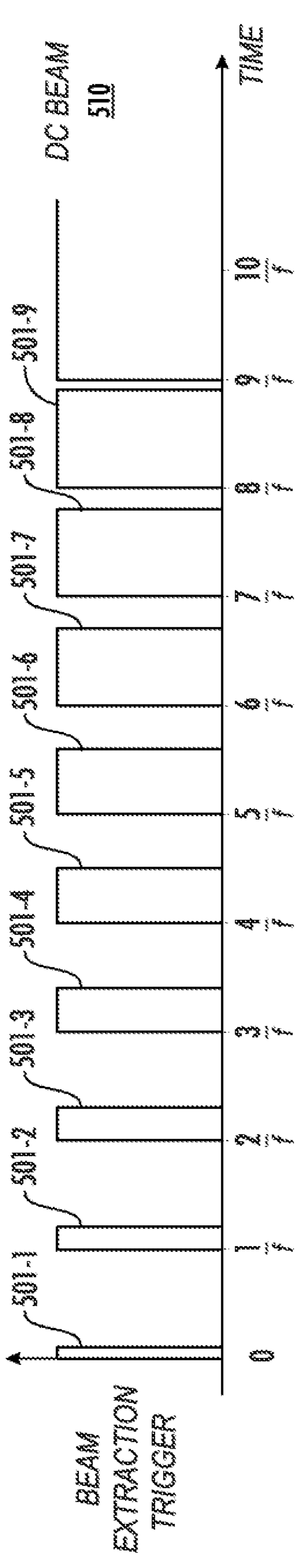
FIGS. 8A-8B are timing diagrams depicting example embodiments of pulse sequence for beam extraction.
Figure 8B:
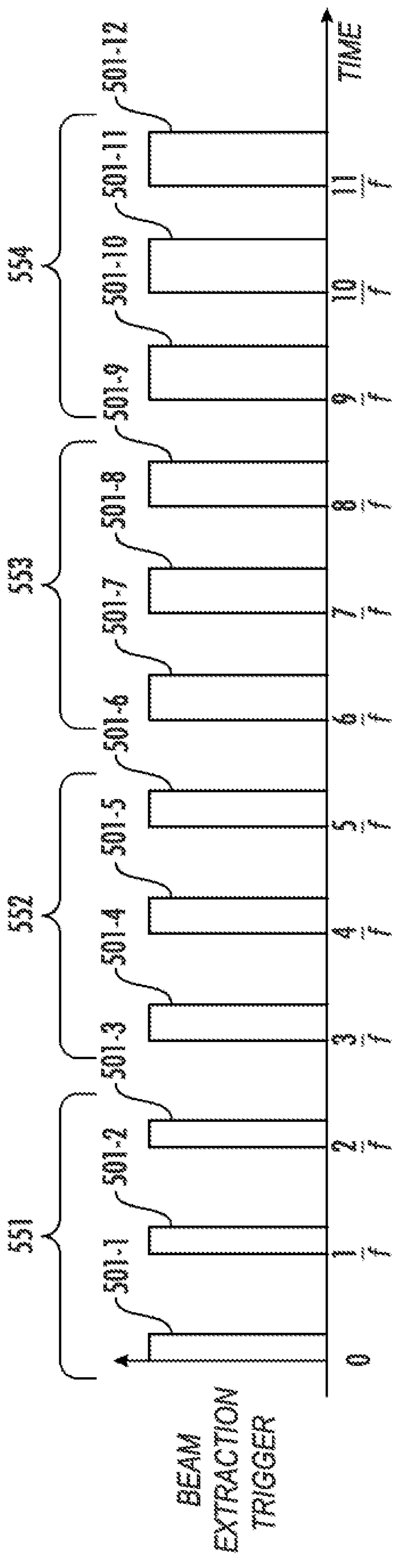

FIGS. 8A and 8B are plots depicting example embodiments of pulse sequences for beam extraction within an example beam system 10. An example beam operation includes extracting a beam according to a beam extraction trigger sequence and a given duty cycle function. The beam extraction trigger sequence can include issuance, by a control system (e.g., 3001A), of a first command to change the beam source's set point to a desired current level so that source 12 is ready to output a beam having a desired current magnitude. The control system (e.g., 3001A) can then cause (e.g., by way of issuing a second command) a bias voltage to be applied to the electrodes of accelerator 16, and the accelerator voltage increases towards $V_N$ (e.g., nominal voltage or desired operating voltage of the accelerator). The control system 3001A can then cause (e.g., by way of issuing a third command) beam extraction to commence (e.g., by biasing an extraction electrode of source 12). FIGS. 8A and 8B refer to a beam extraction trigger, and the beam extraction trigger can include the aforementioned sequence of commands in order to initiate and/or cause extraction of a beam according to embodiments herein.

The beam extraction trigger sequence can follow a given duty cycle function. The duty cycle function can include a period 1/f (e.g., according to which a beam or pulse can be extracted), a pulse duration (e.g., a duration for which a beam pulse is extracted) that grows over time, or both. That is, a control system (e.g., 3001A, not shown in FIGS. 8A-8B) can be configured (e.g., programmed) to issue one or more commands causing beam extraction at specified times. In the example embodiment of FIG. 8A, a first pulse 501 is extracted at a time 0. The beam extraction can continue for a first pulse duration before the beam extraction is discontinued or ceased, e.g., as a result of one or more commands issued by control system 3001A. Control system 3001A can then issue one or more commands causing beam extraction at a time 1/f for a second pulse duration that is longer than the first pulse duration. The second pulse duration can end as a result of one or more commands issued by control system 3001A to discontinue beam extraction. The control system 3001A can then issue one or more commands causing beam extraction at a time 2/f for a third pulse duration time that is longer than the second pulse duration as well as the first pulse duration. The third pulse duration can end as a result of one or more commands issued by control system 3001A to discontinue beam extraction. The control system 3001A can then issue one or more commands causing beam extraction at a time 3/f for a fourth pulse duration time that is longer than each of the third pulse duration, the second pulse duration, and the first pulse duration. The fourth pulse duration can end as a result of one or more commands issued by control system 3001A to discontinue beam extraction. The control system 3001A can then issue one or more commands causing beam extraction at a time 4/f for a fifth pulse duration time that is longer than each of the fourth pulse duration, third pulse duration, the second pulse duration, and the first pulse duration. The example operations can continue until an Nth extraction signal is initiated forming a DC beam 510, where N is a number and can be set according to the particular embodiment (e.g., N can be 5, 50, 500, 5000, etc.).

FIG. 8A depicts an embodiment where pulse duration is increased with each successive pulse. Other embodiments can vary. FIG. 8B depicts an example embodiment where pulses are repeated at a particular duration before the next increase. Here, a first set 551 of pulses 501-1 through 501-3 are extracted, where each pulse has the same duration. Then a second set 552 of pulses 501-4 through 501-6 are extracted where each pulse again has the same duration, but the duration is longer than the pulse durations of the first set 551. A third set 553 of still longer duration pulses 501-7 through 501-9 is then extracted, followed by a fourth set 554 of even longer pulses 501-10 through 501-12. This process can continue with sets of successively increasing pulse duration until DC beam formation occurs. In this embodiment each set includes three pulses, however the sets can have other pulse counts that are the same or different from each other. The time period for a set can be predetermined (e.g., pre-programmed) based on pulse count (e.g., a set continues until a predetermined pulse count is reached) or elapsed time (e.g., a set continues until a predetermined time has passed). A set can be terminated dynamically based on feedback from the system, e.g., a set can continue until accelerator voltage levels have stabilized based on sensed feedback to the control system. In other embodiments, the system can commence beam extraction using successively increased duration pulses like the embodiment of FIG. 8A while monitoring for system stability, and upon sensing a load or an instability (e.g., a voltage below a minimum threshold), can transition to an embodiment like that of FIG. 8B where pulses of the same are repeated until such load is mitigated or instability is resolved (or until a predetermined time or count is reached), and then the system can transition back to pulses of successively increasing duration (FIG. 8A). In some embodiments, upon sensing a load or instability the system can revert to pulses of a shorter duration until such time at which pulse duration increase can proceed.

Figure 9:
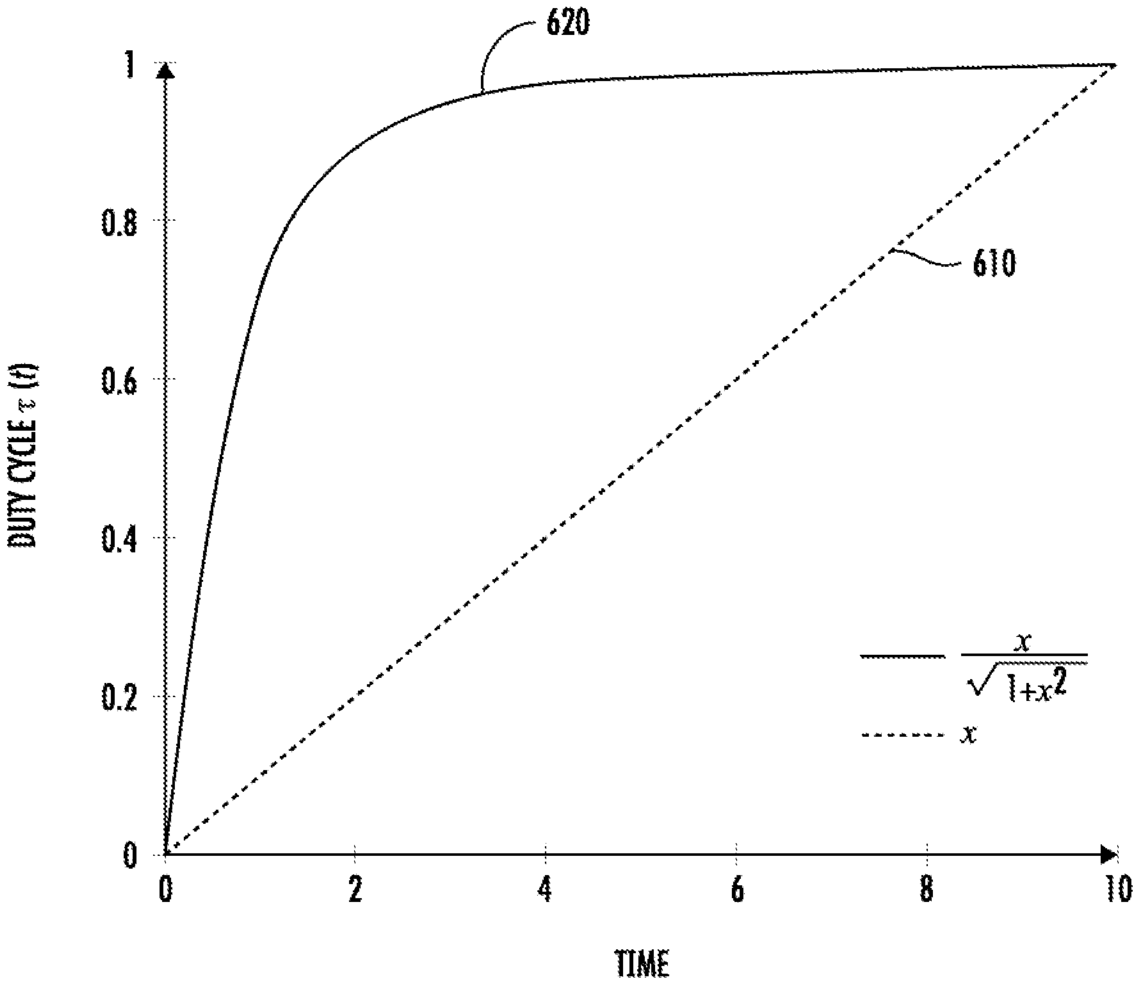
FIG. 9 is a plot depicting an example embodiment of a duty cycle function for use with embodiments of the present disclosure.

FIG. 9 is a plot depicting an example duty cycle function for use with embodiments of the present disclosure. For example, in FIG. 9, duty cycles for use in beam operation (e.g., as depicted in FIGS. 8A-8B) can include a linear or a non-linear function. In FIG. 9, a first function x 610 (e.g., represented by a dashed line) can be a linear function according to which a duty cycle can be computed or generated. An alternative, or second function $$\frac{x}{\sqrt{1+x^2}}$$ 620(e.g., represented by a solid line) can be a non-linear function according to which a duty cycle can be computed or generated. It will be appreciated that a duty cycle can be selected or tuned according to the power supple (e.g., PS6) for the accelerator 16. Examples of criterion for determining a duty cycle function can include an ability of the accelerator power supply to maintain an output voltage within a specific range (e.g., a safe or safety corridor). In examples, slowing down a variation rate of a duty cycle when an accelerator power supply starts to detect a load increase induced by a pulsed beam can be preferred.

Figure 10:
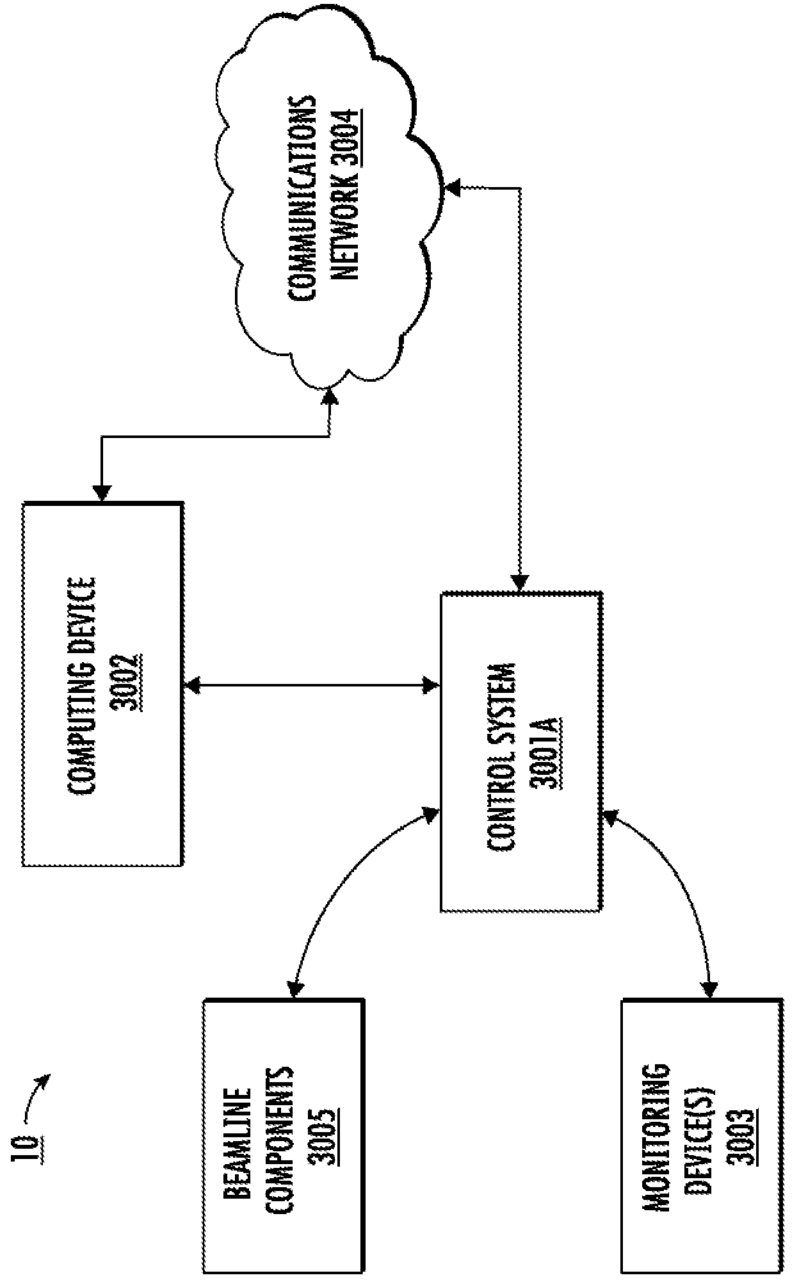
FIG. 10 is a block diagram depicting a system within which embodiments of the present disclosure can operate.

FIG. 10 is a block diagram showing an example system within which embodiments of the present disclosure can operate. For example, the illustrated example system includes beam system 10 and one or more computing devices 3002. In embodiments, beam system 10 can be part of an example neutron beam system (e.g., system 10 above). In such embodiments, the beam system 10 can employ one or more control systems 3001A with which one or more computing devices 3002 can communicate in order to interact with the systems and components of the beam system 10 (e.g., neutron beam system 10). Each of these devices and/or systems are configured to communicate directly with one another or via a local network, such as network 3004.

Computing devices 3002 can be embodied by various user devices, systems, computing apparatuses, and the like. For example, a first computing device 3002 can be a desktop computer associated with a particular user, while another computing device 3002 can be a laptop computer associated with a particular user, and yet another computing device 3002 can be a mobile device (e.g., a tablet or smart device). Each of the computing devices 3002 can be configured to communicate with the beam system 10, for example through a user interface accessible via the computing device. For example, a user can execute a desktop application on the computing device 3002, which is configured to communicate with the beam system 3001.

By using a computing device 3002 to communicate with beam system 3001, a user can provide operating parameters for components 3005 (e.g., operating voltages, and the like) according to embodiments described herein. In embodiments, beam system 10 can include a control system 3001A by which beam system 10 can receive and apply operating parameters from computing device 3002.

Control system 3001A can be configured to receive measurements, signals, or other data from components 3005 and monitoring devices 3003 of the beam system 10. For example, control system 3001A can receive signals from one or more monitoring devices 3003 indicative of operating conditions and/or a position of a beam passing through the beam system 3001. The control system 3001A, depending on the operating conditions and/or position of the beam passing through the beam system, can provide adjustments to inputs of one or more beam line components 3005 according to the methods described herein. The control system 3001A can also provide information collected from any of the components of the beam system 10, including the monitoring devices 3003, to the computing device 3002 either directly or via communications network 3004.

Communications network 3004 can include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 3004 can include an 802.11, 802.16, 802.20, and/or WiMax network. Further, the communications network 3004 can include a public network, such as the Internet, a private network, such as an intranet, or combinations thereof, and can utilize a variety of networking protocols now available or later developed including, but not limited to TCP/IP based networking protocols.

Figure 11:
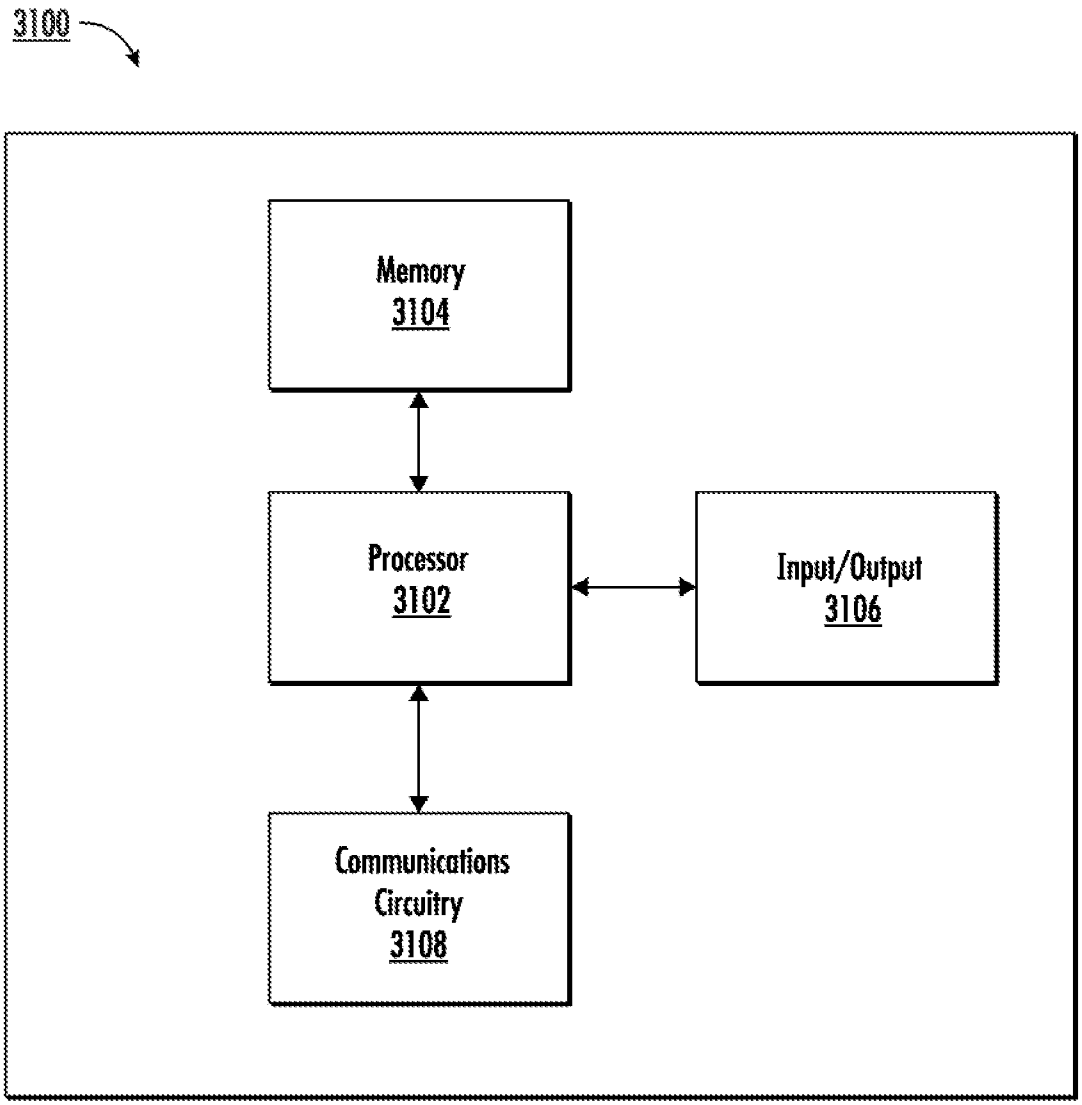
FIG. 11 is a block diagram depicting an example embodiment of a computing apparatus that can be specially configured in accordance with embodiments of the present disclosure.

The computing device 3002 and control system 3001A can be embodied by one or more computing systems, such as apparatus 3100 shown in FIG. 11. As illustrated in FIG. 11, the apparatus 3100 can include a processor 3102, a memory 3104, an input and/or output circuitry 3106, and communications device or circuitry 3108. It should also be understood that certain of these components 3102-3108 can include similar hardware. For example, two components can both leverage use of the same processor, network interface, storage medium, or the like to perform their associated functions, such that duplicate hardware is not required for each device. The use of the terms "device" and/or "circuitry" as used herein with respect to components of the apparatus therefore can encompass particular hardware configured with software to perform the functions associated with that particular device, as described herein.

The terms "device" and/or "circuitry" should be understood broadly to include hardware, in some embodiments, device and/or circuitry can also include software for configuring the hardware. For example, in some embodiments, device and/or circuitry can include processing circuitry, storage media, network interfaces, input/output devices, and the like. In some embodiments, other elements of the apparatus 3100 can provide or supplement the functionality of particular device(s). For example, the processor 3102 can provide processing functionality, the memory 3104 can provide storage functionality, the communications device or circuitry 3108 can provide network interface functionality, and the like.

In some embodiments, the processor 3102 (and/or co-processor or any other processing circuitry assisting or otherwise associated with the processor) can be in communication with the memory 3104 via a bus for passing information among components of the apparatus. The memory 3104 can be non-transitory and can include, for example, one or more volatile and/or non-volatile memories. In other words, for example, the memory can be an electronic storage device (e.g., a computer readable storage medium.) The memory 3104 can be configured to store information, data, content, applications, instructions, or the like, for enabling the apparatus to carry out various functions in accordance with example embodiments of the present disclosure.

The processor 3102 can be embodied in a number of different ways and can, for example, include one or more processing devices configured to perform independently. Additionally or alternatively, the processor can include one or more processors configured in tandem via a bus to enable independent execution of instructions, pipelining, and/or multithreading. The use of the terms "processing device" and/or "processing circuitry" can be understood to include a single core processor, a multi-core processor, multiple processors internal to the apparatus, and/or remote or "cloud" processors.

In an example embodiment, the processor 3102 can be configured to execute instructions stored in the memory 3104 or otherwise accessible to the processor. Alternatively or additionally, the processor can be configured to execute hard-coded functionality. As such, whether configured by hardware or software methods, or by a combination of hardware with software, the processor can represent an entity (e.g., physically embodied in circuitry) capable of performing operations according to an embodiment of the present disclosure while configured accordingly. Alternatively, as another example, when the processor is embodied as an executor of software instructions, the instructions can specifically configure the processor to perform the algorithms and/or operations described herein when the instructions are executed.

In some embodiments, the apparatus 3100 can include input/output device 3106 that can, in turn, be in communication with processor 3102 to provide output to the user and, in some embodiments, to receive input from the user. The input/output device 3106 can include a user interface and can include a device display, such as a user device display, that can include a web user interface, a mobile application, a client device, or the like. In some embodiments, the input/output device 3106 can also include a keyboard, a mouse, a joystick, a touch screen, touch areas, soft keys, a microphone, a speaker, or other input/output mechanisms. The processor and/or user interface circuitry including the processor can be configured to control one or more functions of one or more user interface elements through computer program instructions (e.g., software and/or firmware) stored on a memory accessible to the processor (e.g., memory 3104, and/or the like).

The communications device or circuitry 3108 can be any means such as a device or circuitry embodied in either hardware or a combination of hardware and software that is configured to receive and/or transmit data from/to a network and/or any other device or circuitry in communication with the apparatus 3100. In this regard, the communications device or circuitry 3108 can include, for example, a network interface for enabling communications with a wired or wireless communication network. For example, the communications device or circuitry 3108 can include one or more network interface cards, antennas, buses, switches, routers, modems, and supporting hardware and/or software, or any other device suitable for enabling communications via a network. Additionally or alternatively, the communication interface can include the circuitry for interacting with the antenna(s) to cause transmission of signals via the antenna(s) or to handle receipt of signals received via the antenna(s). These signals can be transmitted by the apparatus 3100 using any of a number of wireless personal area network (PAN) technologies, such as current and future Bluetooth standards (including Bluetooth and Bluetooth Low Energy (BLE)), infrared wireless (e.g., IrDA), FREC, ultra-wideband (UWB), induction wireless transmission, or the like. In addition, it should be understood that these signals can be transmitted using Wi-Fi, Near Field Communications (NFC), Worldwide Interoperability for Microwave Access (WiMAX), or other proximity-based communications protocols.

As will be appreciated, any such computer program instructions and/or other type of code can be loaded onto a computer, processor, or other programmable apparatus' circuitry to produce a machine, such that the computer, processor, or other programmable circuitry that executes the code on the machine creates the means for implementing various functions, including those described herein.

As described above and as will be appreciated based on this disclosure, embodiments of the present disclosure can be configured as systems, methods, mobile devices, backend network devices, and the like. Accordingly, embodiments can comprise various means including entirely of hardware or any combination of software and hardware. Furthermore, embodiments can take the form of a computer program product on at least one non-transitory computer-readable storage medium having computer-readable program instructions (e.g., computer software) embodied in the storage medium. Any suitable computer-readable storage medium can be utilized including non-transitory hard disks, CD-ROMs, flash memory, optical storage devices, or magnetic storage devices.

Processing circuitry for use with embodiments of the present disclosure can include one or more processors, microprocessors, controllers, and/or microcontrollers, each of which can be a discrete chip or distributed amongst (and a portion of) a number of different chips. Processing circuitry for use with embodiments of the present disclosure can include a digital signal processor, which can be implemented in hardware and/or software of the processing circuitry for use with embodiments of the present disclosure. Processing circuitry for use with embodiments of the present disclosure can be communicatively coupled with the other components of the figures herein. Processing circuitry for use with embodiments of the present disclosure can execute software instructions stored on memory that cause the processing circuitry to take a host of different actions and control the other components in figures herein.

Memory for use with embodiments of the present disclosure can be shared by one or more of the various functional units, or can be distributed amongst two or more of them (e.g., as separate memories present within different chips). Memory can also be a separate chip of its own. Memory can be non-transitory, and can be volatile (e.g., RAM, etc.) and/or non-volatile memory (e.g., ROM, flash memory, F-RAM, etc.).

Computer program instructions for carrying out operations in accordance with the described subject matter can be written in any combination of one or more programming languages, including an object oriented programming language such as Java, JavaScript, Smalltalk, C++, C #, Transact-SQL, XML, PHP or the like and conventional procedural programming languages, such as the "C" programming language or similar programming languages.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In some embodiments, a method of initiating beam transport for a tandem accelerator system, includes biasing one or more electrodes of the tandem accelerator system to a first voltage level. In some of these embodiments, the method further includes extracting a charged particle beam from a beam source such that the charged particle beam is transported through the tandem accelerator system. In some of these embodiments, the charged particle beam has a beam current at a first beam current level that results in a first transient voltage drop of the tandem accelerator system within a threshold. In some of these embodiments, the method further includes increasing the beam current at a rate that results in one or more subsequent transient voltage drops of the tandem accelerator system until the beam current reaches a second beam current level. In some of these embodiments, the one or more subsequent transient voltage drops are within the threshold.

In some of these embodiments, the threshold corresponds to a beam deflection time of the charged particle beam off of a beam axis that is less than a maximum beam deflection time.

In some of these embodiments, the threshold corresponds to an adjustment response time of beam optics of a beam system within which the tandem accelerator system is situated.

In some of these embodiments, the method further includes tuning the beam source to provide the charged particle beam having the beam current at the first beam current level. In some of these embodiments, the beam source is tuned prior to extracting the charged particle beam. In some of these embodiments, extracting the charged particle beam includes biasing an extraction electrode upon determining that the beam source is tuned.

In some of these embodiments, tuning the beam source includes sending a command to the beam source to operate at the first beam current level. In some of these embodiments, tuning the beam source is performed prior to biasing one or more electrodes of the tandem accelerator system to a first voltage level.

In some of these embodiments, increasing the beam current includes sending a command to the beam source to operate at the second beam current level.

In some of these embodiments, the beam source is an ion source. In some of these embodiments, tuning the ion source includes matching one or more of plasma parameters near an ion extraction region such that the plasma is sufficient to facilitate reliable extraction of the ion beam at the requested current.

In some of these embodiments, the ion source includes a volumetric type ion source. In some of these embodiments, tuning the ion source includes controlling one or more of controlling arc discharge current, filament current, plasma electrode voltage, extraction electrode voltage, or a rate of hydrogen gas feeding into the ion source.

In some of these embodiments, extracting the charged particle beam is performed after one or more electrodes of the tandem accelerator system have reached the first voltage level. In some of these embodiments, the beam source is configured to provide a charged particle beam to the tandem accelerator system, the tandem accelerator system positioned downstream of the beam source.

In some of these embodiments, the beam source is configured to generate a negative hydrogen ion beam.

In some of these embodiments, the beam source includes a non-cesiated ion source.

In some of these embodiments, the tandem accelerator system includes a first set of electrodes, a charge exchange device, and a second set of electrodes. In some of these embodiments, biasing one or more electrodes of the tandem accelerator system to the first voltage level includes biasing the first set of electrodes and the second set of electrodes.

In some of these embodiments, the charged particle beam is a negative ion beam, the first set of electrodes is configured to accelerate the negative ion beam from a pre-accelerator system, the charge exchange device is configured to convert the negative ion beam to a positive beam, and the second set of electrodes is configured to accelerate the positive beam.

In some of these embodiments, the method further includes forming a neutral beam from the positive beam with a target device.

In some of these embodiments, the method further includes accelerating the charged particle beam, using a pre-accelerator system, as it is propagated from the beam source, through the pre-accelerator system, and to the tandem accelerator system.

In some of these embodiments, the method further includes reducing a bias on one or more electrodes of the tandem accelerator system as a result of a breakdown event at the tandem accelerator system prior to biasing the one or more electrodes of the tandem accelerator system to the first voltage level. In some of these embodiments, the method further includes determining to restart the tandem accelerator system prior to biasing the one or more electrodes of the tandem accelerator system to the first voltage level.

In some of these embodiments, the first beam current level is in the range of 0.01 to 75% of a steady state charge current for the tandem accelerator system.

In some of these embodiments, the second beam current level is a nominal treatment level.

In some of these embodiments, the charged particle beam is a negative ion beam.

In some embodiments, a beam system includes a beam source, a tandem accelerator system including one or more electrodes configured to be biased to a first voltage level, and a control system. In some of these embodiments, the control system is configured to control the beam source to produce a charged particle beam having a beam current at a first beam current level corresponding to a first transient voltage drop of the tandem accelerator system within a threshold. In some of these embodiments, the control system is further configured to control the beam source to increase the beam current at a rate that results in one or more subsequent transient voltage drops of the tandem accelerator system until the beam current reaches a second beam current level. In some of these embodiments, the one or more subsequent transient voltage drops are within the threshold.

In some of these embodiments, the threshold corresponds to a beam deflection time of the charged particle beam off of a beam axis that is less than a maximum beam deflection time.

In some of these embodiments, the threshold corresponds to an adjustment response time of beam optics of the beam system.

In some of these embodiments, the control system is further configured to tune the beam source to the first beam current level and cause the charged particle beam to be extracted from the beam source with a beam current at the first beam current level.

In some of these embodiments, the control system is further configured to tune the beam source to the second beam current level while causing the charged particle beam to be extracted from the beam source.

In some of these embodiments, the beam source includes an extraction electrode.

In some of these embodiments, the beam source is a volumetric type ion source and the control system is configured to control one or more of arc discharge current, filament current, plasma electrode voltage, extraction electrode voltage, or a rate of hydrogen gas fed into the beam source.

In some of these embodiments, the control system is further configured to control biasing of the one or more electrodes of the tandem accelerator system.

In some of these embodiments, the control system is further configured to cause (a) a bias on the one or more electrodes of the tandem accelerator system to be increased to the first voltage level and (b) the beam source to be tuned to the first beam current level concurrently with (a).

In some of these embodiments, the control system is further configured to cause (a) a bias on the one or more electrodes of the tandem accelerator system to be increased to the first voltage level and (b) the beam source to be tuned to the first beam current level after the bias on the one or more electrodes reaches the first voltage level.

In some of these embodiments, the control system is further configured to cause (a) the beam source to be tuned to the first beam current level and (b) a bias on the one or more electrodes of the tandem accelerator system to be increased to the first voltage level after the beam source is tuned to the first beam current level.

In some of these embodiments, the beam source includes a non-cesiated ion source.

In some of these embodiments, the tandem accelerator system includes a first set of electrodes, a charge exchange device, and a second set of electrodes.

In some of these embodiments, the charged particle beam is a negative ion beam, the first set of electrodes is configured to accelerate the charged particle beam from a pre-accelerator system, the charge exchange device is configured to convert the negative ion beam to a positive beam, and the second set of electrodes is configured to accelerate the positive beam.

In some of these embodiments, the beam system further includes a target device configured to form a neutral beam from the positive beam received from the tandem accelerator system.

In some of these embodiments, the beam system further includes a pre-accelerator system configured to accelerate the charged particle beam, as it is propagated from the beam source to the tandem accelerator system.

In some of these embodiments, the control system is further configured to cause a bias applied to one or more electrodes of the tandem accelerator system to be reduced as a result of a breakdown event at the tandem accelerator system prior to an increase in the bias of the one or more electrodes of the tandem accelerator system to the first voltage level.

In some of these embodiments, the control system is further configured to determine to restart the tandem accelerator system prior to an increase in the bias of the one or more electrodes of the tandem accelerator system to the first voltage level.

In some of these embodiments, the first beam current level is in the range of 0.01 to 75% of a steady state charge current for the tandem accelerator system.

In some of these embodiments, the second beam current level is a nominal treatment level. In some of these embodiments, the charged particle beam is a negative ion beam.

In many embodiments, a method of modulating beam transport for a beam system includes biasing one or more electrodes of an accelerator system to a voltage level, and selectively extracting charged particle beam pulses from a beam source such that the charged particle beam pulses are transported through the accelerator system and increase in duration over time.

In some of these embodiments, the charged particle beam pulses are extracted according to a duty cycle function that is linear and/or non-linear. In some of these embodiments, the duty cycle function is adjustable in response to a detected load increase induced by the charged particle beam. In some of these embodiments, the charged particle beam pulses are extracted at a frequency f, which can be a fixed or variable frequency. In some of these embodiments, the duty cycle function corresponds to successive charged particle beam pulses of increasing pulse durations. In some of these embodiments, each successive extraction of a charged particle beam pulse is for a longer duration than the immediately preceding charged particle beam pulse.

In some of these embodiments, a first charged particle beam pulse is extracted at a first time 1/f for a first pulse duration and a second charged particle beam pulse is extracted at a second time 2/f for a second pulse duration. In some of these embodiments, the second pulse duration is greater than the first pulse duration.

In some of these embodiments, a first set of charged particle beam pulses are extracted followed by a second set of charged particle beam pulses. In some of these embodiments, each pulse in the first set has a first duration and each pulse in the second set has a second duration that is longer than the first duration. In some of these embodiments, the second set of charged particle beam pulses commences after a predetermined number of charged particle beam pulses in the first set have been extracted. In some of these embodiments, the second set of charged particle beam pulses commences after expiration of a predetermined time during which the first set of charged particle beam pulses is extracted.

In some of these embodiments, the method further includes sensing a load or instability while extracting the first set of charged particle pulses, and extracting the second set of charged particle pulses after resolution of the sensed load or instability. In some of these embodiments, the load or instability is a voltage drop.

In some of these embodiments, selectively extracting the charged particle beam includes biasing an extraction electrode.

In some of these embodiments, the accelerator system is a tandem accelerator system. In some of these embodiments, selectively extracting the charged particle beam is performed after one or more electrodes of the tandem accelerator system have reached the voltage level.

In some of these embodiments, the beam source is configured to provide a charged particle beam to the accelerator system, the accelerator system positioned downstream of the beam source.

In some of these embodiments, the beam source is configured to generate a negative hydrogen ion beam.

In some of these embodiments, the beam source includes a non-cesiated ion source.

In some of these embodiments, the accelerator system is a tandem accelerator system including a first set of multiple electrodes, a charge exchange device, and a second set of multiple electrodes. In some of these embodiments, biasing one or more electrodes of the tandem accelerator system to the voltage level includes biasing the first set of multiple electrodes and the second set of multiple electrodes. In some of these embodiments, the charged particle beam is a negative ion beam. In some of these embodiments, the first set of multiple electrodes is configured to accelerate the negative ion beam from a pre-accelerator system, the charge exchange device is configured to convert the negative ion beam to a positive beam, and the second set of multiple electrodes is configured to accelerate the positive beam. In some of these embodiments, the method further includes forming a neutral beam from the positive beam with a target device.

In some of these embodiments, the method further includes accelerating the charged particle beam, using a pre-accelerator system, as it is propagated from the beam source, through the pre-accelerator system, and to the accelerator system.

In some of these embodiments, the method further includes extracting a continuous charged particle beam.

In some embodiments, a beam system includes a beam source, an accelerator system, and a control system configured to control the beam source to cause charged particle beam pulses of increasing duration to be selectively extracted from the beam source and transported through the accelerator system. In some of these embodiments, the control system is configured to control the beam source to cause charged particle beam pulses to be extracted according to a duty cycle function that is linear and/or non-linear. In some of these embodiments, the control system is further configured to detect a load increase induced by the charged particle beam and adjust the duty cycle function in response to the detected load increase.

In some of these embodiments, the control system is configured to control the beam source to cause the charged particle beam pulses to be selectively extracted at a frequency f, which can be a fixed or constant frequency. In some of these embodiments, the duty cycle function is configured to cause extraction of charged particle beam pulses of successively increasing pulse durations. In some of these embodiments, the control system is configured to control the beam source to cause a first set of charged particle beam pulses to be extracted followed by a second set of charged particle beam pulses. In some of these embodiments, each pulse in the first set has a first duration and each pulse in the second set has a second duration that is longer than the first duration.

In some of these embodiments, the control system is configured to control the beam source to extract the second set of charged particle beam pulses after a predetermined number of charged particle beam pulses in the first set have been extracted. In some of these embodiments, the control system is configured to control the beam source to commence extraction of the second set of charged particle beam pulses after expiration of a predetermined time during which the first set of charged particle beam pulses is extracted. In some of these embodiments, the control system is configured to sense a load change or instability, and cause the beam source to continue extraction of charged particle pulses of the same duration until resolution of the sensed load change or instability.

In some of these embodiments, the accelerator system is a tandem accelerator system including one or more electrodes configured to be biased to a first voltage level.

In some of these embodiments, the control system is further configured to control application of a bias to an extraction electrode to cause selective extraction of the charged particle beam.

In some of these embodiments, the beam source includes an extraction electrode.

In some of these embodiments, the control system is configured to control application of a bias to the one or more electrodes of the accelerator system.

In some of these embodiments, the accelerator system is a tandem accelerator system including a first set of multiple electrodes, a charge exchange device, and a second set of multiple electrodes. In some of these embodiments, the charged particle beam is a negative ion beam. In some of these embodiments, the first set of multiple electrodes is configured to accelerate the charged particle beam from a pre-accelerator system, the charge exchange device is configured to convert the negative ion beam to a positive beam, and the second set of multiple electrodes is configured to accelerate the positive beam.

In some of these embodiments, the beam system further includes a target device configured to form a neutral beam from the positive beam received from the tandem accelerator system.

In some of these embodiments, the beam system further includes a pre-accelerator system configured to accelerate the charged particle beam pulses from the beam source to the accelerator system.

In some of these embodiments, the charged particle beam pulses are negative ion beam pulses.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

As used herein and in the appended claims, the singular forms “a,” “an,” and “the” include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments can be recited in or added to the claims, as well as negative limitations that define the inventive scope of the claims by features, functions, steps, or elements that are not within that scope.

What is claimed is:

1. A method of initiating beam transport for a tandem accelerator system, the method comprising:

biasing one or more electrodes of the tandem accelerator system to a first voltage level;

extracting a charged particle beam from a beam source such that the charged particle beam is transported through the tandem accelerator system, wherein the charged particle beam has a beam current at a first beam current level that results in a first transient voltage drop of the tandem accelerator system within a threshold such that the one or more electrodes maintain a non-zero voltage; and increasing the beam current at a rate that results in one or more subsequent transient voltage drops of the tandem accelerator system until the beam current reaches a second beam current level, wherein the one or more subsequent transient voltage drops are within the threshold.

2. The method of claim 1, wherein the threshold corresponds to a beam deflection time of the charged particle beam off of a beam axis that is less than a maximum beam deflection time.

3. The method of claim 1, wherein the threshold corresponds to an adjustment response time of beam optics of a beam system within which the tandem accelerator system is situated.

4. The method of claim 1, further comprising tuning the beam source to provide the charged particle beam having the beam current at the first beam current level.

5. The method of claim 4, wherein the beam source is tuned prior to extracting the charged particle beam.

6. The method of claim 4, wherein extracting the charged particle beam comprises biasing an extraction electrode upon determining that the beam source is tuned.

7. The method of claim 4, wherein tuning the beam source comprises sending a command to the beam source to operate at the first beam current level.

8. The method of claim 7, wherein tuning the beam source is performed prior to biasing one or more electrodes of the tandem accelerator system to a first voltage level.

9. The method of claim 1, wherein increasing the beam current comprises sending a command to the beam source to operate at the second beam current level.

10. The method of claim 4, wherein the beam source is an ion source, and tuning the ion source comprises matching a plasma parameter near an ion extraction region of the source such that the plasma is sufficient for extraction of the ion beam at the requested current.

11. The method of claim 10, wherein the ion source comprises a volumetric type ion source and tuning the ion source comprises controlling one or more of controlling arc discharge current, filament current, plasma electrode voltage, extraction electrode voltage, or a rate of hydrogen gas feeding into the ion source.

12. The method of claim 1, wherein extracting the charged particle beam is performed after one or more electrodes of the tandem accelerator system have reached the first voltage level.

13. The method of claim 1, wherein the beam source is configured to provide a charged particle beam to the tandem accelerator system, the tandem accelerator system positioned downstream of the beam source.

14. The method of claim 1, wherein the beam source is configured to generate a negative hydrogen ion beam.

15. The method of claim 1, wherein the beam source comprises a non-cesiated ion source.

16. The method of claim 1, wherein the tandem accelerator system comprises a first plurality of electrodes, a charge exchange device, and a second plurality of electrodes.

17. The method of claim 16, wherein biasing one or more electrodes of the tandem accelerator system to the first voltage level comprises biasing the first plurality of electrodes and the second plurality of electrodes.

18. The method of claim 16, wherein the charged particle beam is a negative ion beam, and wherein the first plurality of electrodes is configured to accelerate the negative ion beam from a pre-accelerator system, the charge exchange device is configured to convert the negative ion beam to a positive beam, and the second plurality of electrodes is configured to accelerate the positive beam.

19. The method of claim 18, further comprising forming a neutral beam from the positive beam with a target device.

20. The method of claim 1, further comprising:

accelerating the charged particle beam, using a pre-accelerator system, as it is propagated from the beam source, through the pre-accelerator system, and to the tandem accelerator system.

21. The method of claim 1, further comprising:

reducing a bias on one or more electrodes of the tandem accelerator system as a result of a breakdown event at the tandem accelerator system prior to biasing the one or more electrodes of the tandem accelerator system to the first voltage level.

22. The method of claim 21, further comprising:

determining to restart the tandem accelerator system prior to biasing the one or more electrodes of the tandem accelerator system to the first voltage level.

23. The method of claim 1, wherein the first beam current level is in a range of 0.01 to 75% of a steady state charge current for the tandem accelerator system.

24. The method of claim 1, wherein the second beam current level is a nominal treatment level.

25. The method of claim 1, wherein the charged particle beam is a negative ion beam.

26. A beam system, comprising:

a beam source;

a tandem accelerator system comprising one or more electrodes configured to be biased to a first voltage level; and a control system configured to:

control the beam source to produce a charged particle beam having a beam current at a first beam current level corresponding to a first transient voltage drop of the tandem accelerator system within a threshold such that the one or more electrodes maintain a non-zero voltage; and control the beam source to increase the beam current at a rate that results in one or more subsequent transient voltage drops of the tandem accelerator system until the beam current reaches a second beam current level, wherein the one or more subsequent transient voltage drops are within the threshold.

* * * * *